United States Patent
Zhang et al.

(10) Patent No.: US 7,458,084 B2
(45) Date of Patent: Nov. 25, 2008

(54) METHODS AND SYSTEMS FOR CONVERGED SERVICE CREATION AND EXECUTION ENVIRONMENT APPLICATIONS

(75) Inventors: Li Zhang, Alpharetta, GA (US); Jeffrey P. Cassanova, Hiram, GA (US); Robert B. Collicott, Smyrna, GA (US)

(73) Assignee: AT&T Delaware Intellectual Property, Inc., Wilmington, DE (US)

( * ) Notice: Subject to any disclaimer, the term of this patent is extended or adjusted under 35 U.S.C. 154(b) by 170 days.

(21) Appl. No.: 11/202,988

(22) Filed: Aug. 12, 2005

(65) Prior Publication Data

US 2006/0112400 A1    May 25, 2006

Related U.S. Application Data

(63) Continuation of application No. 09/893,437, filed on Jun. 29, 2001, now Pat. No. 6,981,263.

(51) Int. Cl.
G06F 3/00 (2006.01)
G06F 15/16 (2006.01)
H04K 1/00 (2006.01)

(52) U.S. Cl. .................... 719/328; 709/227; 705/80
(58) Field of Classification Search ............. 719/328, 719/310; 709/227, 228; 705/80
See application file for complete search history.

(56) References Cited

U.S. PATENT DOCUMENTS

| | | | |
|---|---|---|---|
| 5,574,779 A | 11/1996 | Ely | |
| 5,748,493 A | 5/1998 | Lightfoot | |
| 5,790,173 A | 8/1998 | Strauss | |
| 5,875,302 A | 2/1999 | Obhan | |
| 5,892,905 A | 4/1999 | Brandt | |
| 5,941,957 A * | 8/1999 | Ingrassia et al. | 709/248 |
| 6,012,067 A | 1/2000 | Sarkar | |
| 6,021,263 A * | 2/2000 | Kujoory et al. | 709/232 |
| 6,035,281 A | 3/2000 | Crosskey | |
| 6,073,168 A | 6/2000 | Mighdoll | |
| 6,088,044 A | 7/2000 | Kwok | |
| 6,134,591 A | 10/2000 | Nickles | |
| 6,138,238 A | 10/2000 | Scheifler | |
| 6,141,689 A | 10/2000 | Yasrebi | |
| 6,173,326 B1 | 1/2001 | Collins | |
| 6,192,476 B1 | 2/2001 | Gong | |
| 6,201,862 B1 | 3/2001 | Mercouroff | |
| 6,286,027 B1 | 9/2001 | Dwyer | |
| 6,311,186 B1 | 10/2001 | Melampy | |
| 6,311,297 B1 | 10/2001 | Mighdoll | |
| 6,317,428 B1 | 11/2001 | Mercouroff | |
| 6,389,471 B1 * | 5/2002 | Agraharam et al. | 709/227 |

(Continued)

OTHER PUBLICATIONS

Chen et al, Dinamic-Agents for Dynamic Service Provisioning Aug. 22, 1998, Cooperative Information Systems, 1998 Proceedings. 3rd IFICIS International Conference on.

*Primary Examiner*—Meng-Ai An
*Assistant Examiner*—Lechi Truong
(74) *Attorney, Agent, or Firm*—Withers & Keys, LLC

(57) ABSTRACT

Embodiments of the present invention relate to systems and methods for a converged service creation and execution application. In an embodiment, an application is coupled to an application server. One or more open application programming interfaces are coupled to the application server, and service session management logic is also coupled to the application server.

4 Claims, 21 Drawing Sheets

U.S. PATENT DOCUMENTS

| | | |
|---|---|---|
| 6,430,177 B1 * | 8/2002 | Luzeski et al. ............... 370/356 |
| 6,446,125 B1 | 9/2002 | Huang |
| 6,449,657 B2 | 9/2002 | Stanbach |
| 6,460,036 B1 | 10/2002 | Herz |
| 6,463,527 B1 | 10/2002 | Vishkin |
| 6,563,914 B2 | 5/2003 | Sammon |
| 6,574,599 B1 * | 6/2003 | Lim et al. ................... 704/270 |
| 6,600,725 B1 | 7/2003 | Roy |
| 6,601,086 B1 | 7/2003 | Howard |
| 6,611,516 B1 | 8/2003 | Pirkola |
| 6,728,884 B1 | 4/2004 | Lim |
| 6,735,631 B1 | 5/2004 | Oehrke |
| 6,760,749 B1 | 7/2004 | Dunlap |
| 6,823,524 B1 | 11/2004 | Hewett |
| 6,865,608 B2 | 3/2005 | Hunter |
| 6,883,015 B1 | 4/2005 | Geen |
| 6,928,468 B2 * | 8/2005 | Leermakers ................ 709/221 |
| 6,950,441 B1 * | 9/2005 | Kaczmarczyk et al. ...... 370/467 |
| 7,003,571 B1 | 2/2006 | Zombeck |
| 7,113,581 B2 * | 9/2006 | Benedyk et al. ............. 379/219 |
| 2001/0054087 A1 | 12/2001 | Flom |
| 2002/0055990 A1 | 5/2002 | Vaman |
| 2002/0116497 A1 | 8/2002 | Tung |
| 2003/0046364 A1 | 3/2003 | Sisco |
| 2005/0021716 A1 | 1/2005 | Adamczyk |

* cited by examiner

METHODS AND SYSTEMS FOR CONVERGED SERVICE CREATION AND EXECUTION ENVIRONMENT APPLICATIONS

RELATED APPLICATIONS

The present application is a continuation of U.S. patent application No. 09/893,437 filed on Jun. 29, 2001 now U.S. Pat. No. 6,981,263 entitled METHODS AND SYSTEMS FOR CONVERGED SERVICE CREATION AND EXECUTION ENVIRONMENT APPLICATIONS and is herein incorporated by reference in its entirety.

FIELD OF THE INVENTION

Embodiments of the present invention relate to integrated data networks. More particularly, embodiments of the present invention relate to methods and systems for converged service creation environment applications.

BACKGROUND OF THE INVENTION

A known communications system architecture is described in the Telecommunications Information Networking Architecture Consortium ("TINA-C") document entitled "Overall Concepts and Principles of TINA," version 1.0, issued Feb. 17, 1995 (hereinafter the "TINA overview"). The overall TINA architecture can include a service architecture having a session model, a network architecture related to transport networks, and a computing architecture having a distributed processing environment (DPE) architecture.

The TINA overview describes a service session concept, where the "session" is defined as representing "a temporal period during which activities are carried out with the purpose of achieving a goal." Four types of sessions are identified: (i) a service session that represents a single activation of a service, (ii) a user session that represents a single user's interaction with a service session; (iii) a communications session that represents the connections associated with a service session; and (iv) an access session that represents a user's attachment to a system and the user's involvement in services.

A service session, as described by the TINA overview, is a single activation of a service that relates users of the service together so that they can interact. The TINA service session can be controlled at least in part by a TINA service session manager, which offers two types of operational interfaces: (a) a generic session control interface that allows users to join and leave a service session; and (b) service specific operations that are dictated by the capabilities offered by service logic of the service session.

FIG. 1 is an illustration of a known system described in the TINA overview. In particular, FIG. 1 depicts a view of the access and the session concepts. User agents 21 and 22 and terminal agents 31 and 32 represent service independent objects, and the remaining system objects (e.g., TINA service session manager 100, TINA communications session manager 110, user sessions 11 and 12, and end user application 51 and 52) depict service specific objects. When a first user is to engage in a document editing session with another user, the first user can select a terminal on which he will access the network (e.g., a workstation with windowing capabilities). As part of a login procedure, the terminal agent 31 and user agent 21 are found (e.g., using trading services of the DPE) and associated with each other. The user can then be presented with a menu of capabilities and can select a document editing option. A request is passed to the user agent 21 to establish a document editing service session. The user agent 21 creates a document editing TINA service session manager 100, and joins the user to the session, causing a user session 11 to be created. Another menu is presented to the user requesting the identification of the other user to be called. After the user agent receives the identification, the user agent 21 requests that the TINA service session manager 100 join the other user in the session. The TINA service session manager 100 uses the identification to locate (e.g., again via trading) the other user agent 22, and a request to join is sent to the user agent 22. After determining which terminal to alert, the user agent 22 alerts the terminal agent 32 of the incoming session request. The terminal agent 32 then alerts the terminal (e.g., by presenting a window on the user's terminal when the user is already logged on). The other user accepts the request, and the acceptance is sent back to the TINA service session manager 100. After receiving the acceptance, the TINA service session manager 100 creates a user session 12 for the other user. The first user then requests the TINA service session manager 100 to set-up an audio-visual connection to the other user, so that the two users can discuss edits to be made before carrying them out. The TINA service session manager 100 requests the TINA communication session manager 110 to establish a stream 111 between end-user applications 51 and 52 (computational objects) residing on the users' terminals (the interface identities of which were passed over in an earlier request or acceptance). When the stream 111 is established, a response is passed back to the first user. The two users can then engage in an audio-video conversation, where they discuss the changes to be made to the document. The first user can direct the TINA service session manager 100 to open the document, and the document appears on the users' screens. Commands to edit the document are sent to the TINA service session manager 100, and the changes are reflected back on the users' screens. At any time, either party may leave the session, which will result in the other party being notified and the deletion of the service session. During the service session, subject to permission, each user may request another user to join.

FIG. 2 shows an illustration of another known system. In particular, FIG. 2 shows a system based on the Reference Service Architecture of the International Softswitch Consortium. Softswitch 220 and signaling gateway 230 can be coupled to an Advanced Intelligent Network ("AIN")/Signaling System 7 ("SS7") signaling network 270 of the public switched telephone network ("PSTN") 260 to perform call control operations of calls placed over the PSTN 260. In an embodiment, the term PSTN encompasses the interconnected collection of local and long distance phone companies in the United States. A media gateway 240 can receive voice data (e.g., PSTN format data) from a telephone via PSTN 260 and convert the voice data into Internet Protocol ("IP") data. Data network 250 can be coupled to softswitches 220 and can carry data from one media gateway 240 to second media gateway 240. In an embodiment, data network 250 can be an Asynchronous Transfer Mode ("ATM") network, an IP network, a MultiProtocol Label Switching ("MPLS") network, a combination thereof, and so forth. For example, a long-distance call can originate from a first telephone. Softswitch 220 can communicate with second softswitch 220 to set-up the long-distance call across network 250 to a second telephone, where media gateways 240 convert the voice communications between the PSTN format and the IP format.

Application server 200 can be coupled to softswitches 220 to provide a service creation platform. Examples of services that can be created and managed by application server 200 include Internet call waiting, a multimedia conferencing, click-to-dial, and so forth. A media server 210 can also be coupled to application server 200 and to network 250 to provide audio announcements with respect to service applications. For example, a media server 210 can provide announcements to users in setting up a conference bridge for a conference call. Media server 210 can also send audio and/or video streams to one or more users and/or IP endpoints. In an embodiment, the signaling between softswitch 220 and signaling gateway 230 can be ISUP (integrated services digital network user part) signaling, TALI (transport adaptive layer interface) signaling, SIGTRAN (signaling transport) signaling, and so on. Media gateway 240 can be a Media Gateway Control Protocol ("MGCP" or "Megaco") compliant gateway, and signaling between softswitch 220 and media gateway 240 can be MGCP/Megaco signaling. Communications between data network 250 and media server 210 or media gateways 240 can be RTP (realtime transport protocol) communications. Communications between application server 240 and softswitches 220 can be according to the Session Initiation Protocol ("SIP").

The AIN/SS7 service creation and execution environment ("SCE") illustrated in FIG. 2, however, is not adequate for broadband and hybrid messaging services. A softswitch 220 is a voice-oriented call processing engine. Softswitch 220 can behave as a PSTN/IP service creation bridge that allows narrowband service creation (e.g., with IP connectivity via the protocol adaption layer). For converged broadband and/or hybrid messaging services, a softswitch call model is not adequate. Also, converged services with flexible billing (e.g., bill by the minute, bill based on throughput, etc.) and/or user-specified Quality of Service ("QoS") can not be adequately provided by the softswitch call model. Moreover, a softswitch does not provide session control at the service level, and softswitch vendors typically have different architectures and proprietary Application Programming Interfaces ("APIs"). A large base of hybrid services exist in the IP domain currently, and that base is increasing. Converged service creation, user-specified QoS, and flexible billing can become key service differentiators for communications service providers (e.g., regional communications service providers, data communications service providers, long-distance communications service providers, and so on). In view of the foregoing, it can be appreciated that a substantial need exists for methods and systems for converged service creation environment applications.

SUMMARY OF THE INVENTION

Embodiments of the present invention relate to methods and systems for converged service creation environment applications. According to an embodiment of the present invention, a system includes an application server, where the application server is coupled to an application. One or more open application programming interfaces are coupled to the application server, and service session management logic is also coupled to the application server.

DETAILED DESCRIPTION OF THE INVENTION

According to an embodiment of the present invention, methods and systems provide for a converged service creation environment ("CSCE") applications. The integrated data network can include an ATM network, an IP network, an MPLS network or a combination thereof. The integrated data network can include and/or be coupled to a PSTN network that includes an AIN/SS7 signaling network. CSCE processes can provide a vendor independent service creation and execution framework. In an embodiment, new network functional components can be easy to add, and upgrading technology without a major impact to service creation and execution can be easy. AIN service creation infrastructure can be interfaced with the CSCE infrastructure, and a service session control mechanism can facilitate converged service creation and execution. The CSCE system and processes can provide a modular, scalable and extensible architecture.

Figure 1:
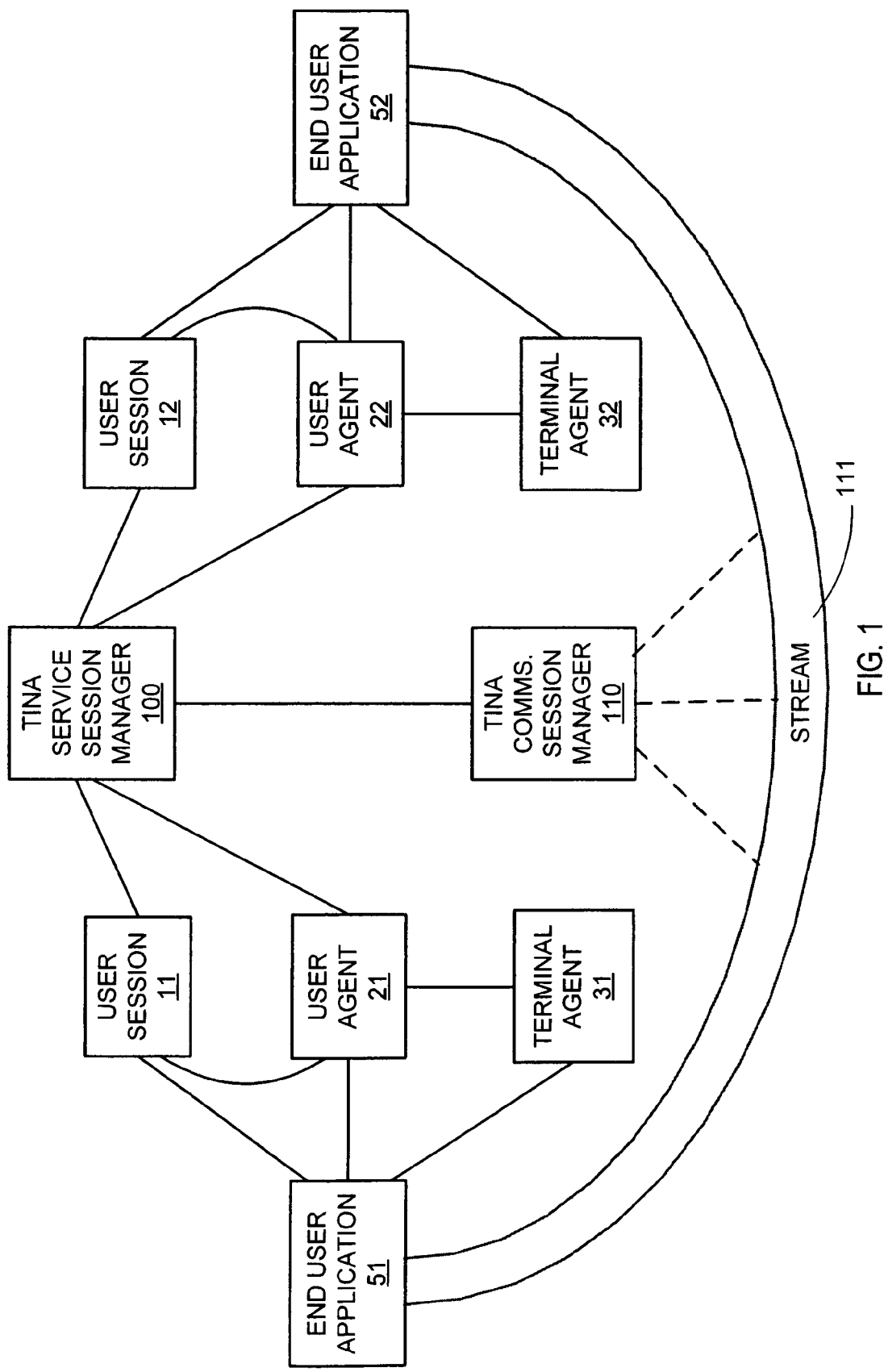
FIG. 1 is an illustration of a known TINA system.
Figure 2:
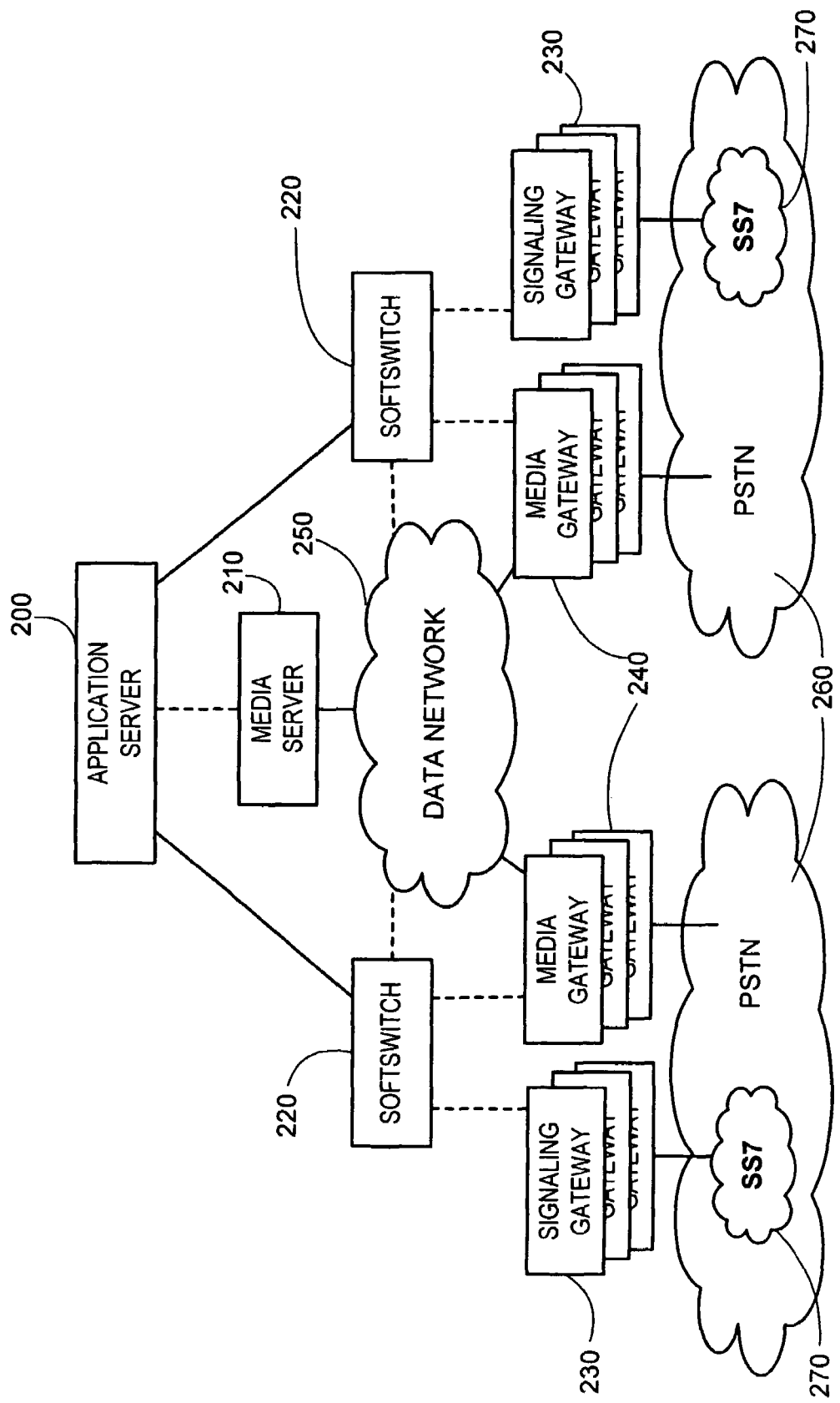
FIG. 2 shows an illustration of another known system.
Figure 3:
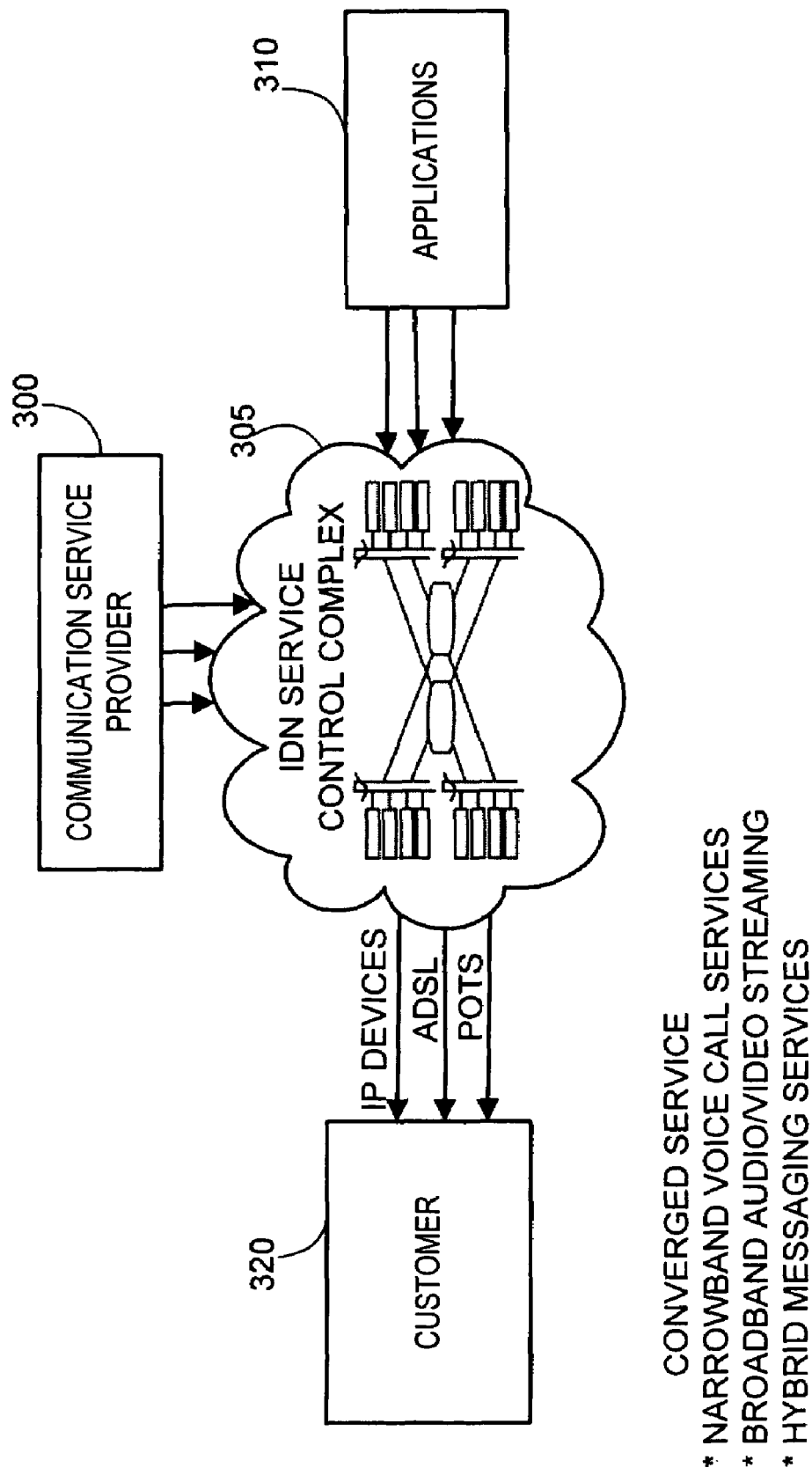
FIG. 3 is a schematic diagram of an overview of an embodiment of the present invention.

FIG. 3 is a schematic diagram of an overview of an embodiment of the present invention. A communications service provider 300 can operate an Next Generation Network ("NGN") service control complex 305. Examples of a communications service provider 300 include a regional communications service provider, a data communications service provider, a long-distance communications service provider, and so on. In an embodiment of the present invention, NGN service control complex 305 can provide a converged service creation and execution environment. The CSCE can provide converged services to a customer 320 based at least in part on applications 310. Examples of converged services provided by the NGN service control complex 305 include narrowband voice call services, broadband audio/video streaming, hybrid messaging services, a combination thereof, and so forth.

In an embodiment, the NGN service control complex 305 can establish a common converged service creation and execution platform. It can provide open APIs to support third party e-commerce applications. Support for traditional class 4/5 services and value-added narrowband services can also be supported. In an embodiment, the NGN service control complex 305 interacts with application service servers (e.g., network resource service servers) that provide broadband services and can control end user CPEs/IADs (customer premises equipment/integrated access devices) that receive network services. The NGN service control complex 305, in an embodiment, can coordinate network service components and allow component level service interactions.

Figure 4:
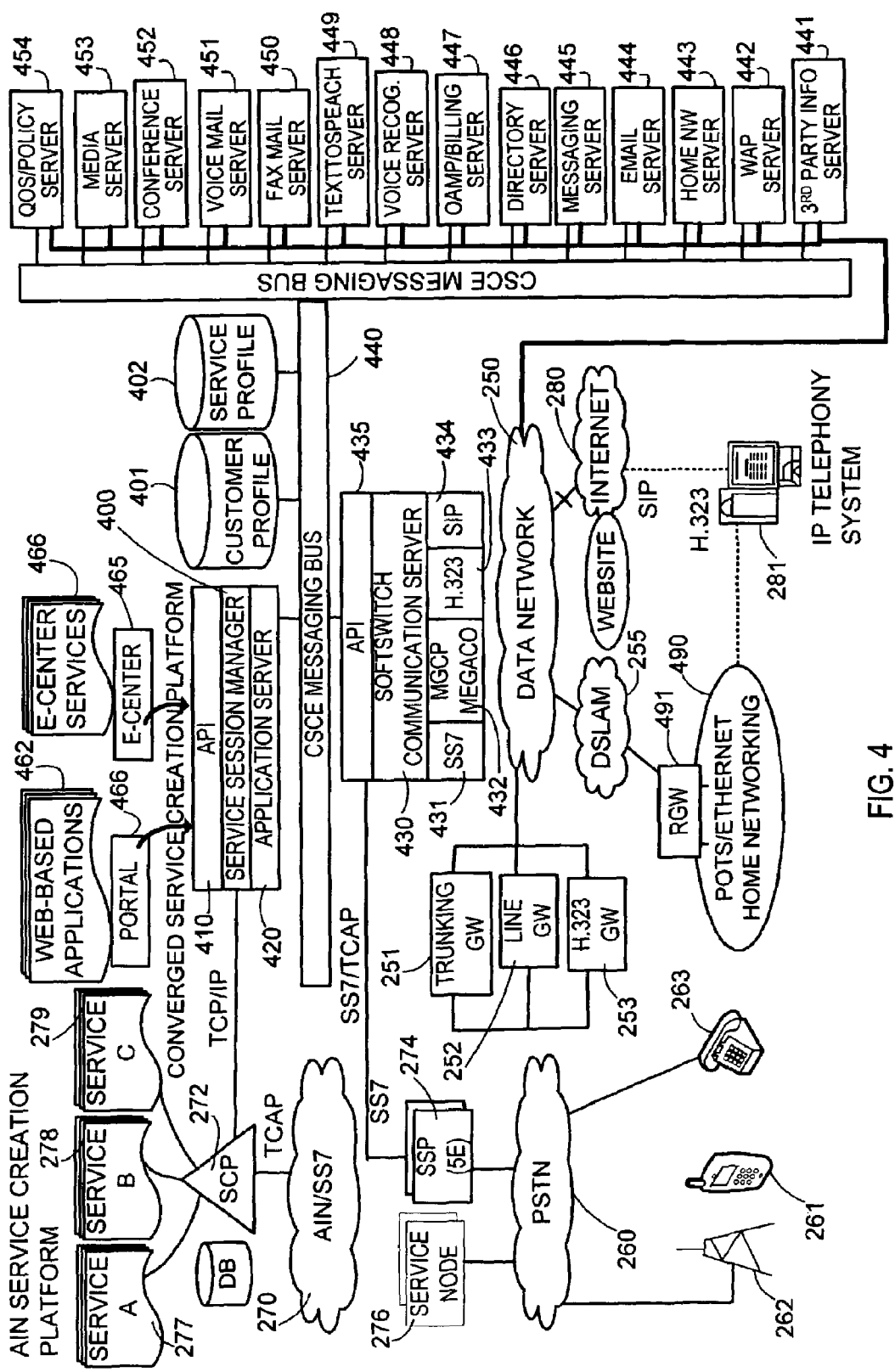
FIG. 4 shows an illustration of an embodiment of the present invention.

FIG. 4 shows an illustration of an embodiment of the present invention. PSTN 260 can be coupled to and/or include AIN/SS7 signaling network 270. As used to describe embodiments of the present invention, the term "coupled" encompasses a direct connection, an indirect connection, or a combination thereof. Moreover, two devices that are coupled can engage in direct communications, in indirect communications, or a combination thereof.

AIN/SS7 signaling network 270 can be coupled to and/or include a Service Control Point ("SCP") 272. SCP 272 includes a database and supplies the translation and routing data needed to deliver advanced network services. AIN/SS7 signaling network 270 can also be coupled to Service Switching Point ("SSP") 274. In an embodiment, SSP 274 is a PSTN switch that can recognize intelligent network ("IN") calls and route and connect the calls under the direction of an SCP. PSTN 260 can also be coupled to Service Node 276. A plurality of AIN services 277-279 can be provided via SCP 272. Examples of AIN services include intelligent call routing, privacy management, call-screening, and so on.

A wireless communications device 261 (e.g., a wireless phone, a cellular phone, wireless messaging device, and so on) can be coupled to PSTN 260 via base station 262. PSTN 260 can also be coupled to a telephone 263. A trunking gateway 251, a line gateway 252, and an H.323 gateway 253 can bridge the PSTN 260 to the data network 250. Communications between data network 250 and gateways 251-253 can be RTP communications, RTCP (real time control protocol) communications, and so forth. Trunking gateway 251 can be coupled to the PSTN via a trunk such as an intermachine trunk ("IMT"). Line gateway 252 can be coupled to the PSTN via an interface such as a primary rate interface ("PRI") and/or a plain old telephone service ("POTS") interface. H.323 gateway 253 can be coupled to the PSTN via a PRI.

Data network 250 can be coupled to a subscriber premises via a digital subscriber line access multiplexer ("DSLAM") 255 and a residential gateway 491. Residential gateway ("RGW") 491 can be a MGCP/Megaco compliant gateway. In an embodiment, the subscriber premises can include a home networking system 490 (e.g., a Home Phoneline Networking Alliance ("HPNA") network, an Ethernet network, a wireless network, etc.) coupled to residential gateway 491. Data network 250 can also be coupled to a subscriber premises via the Internet 280 and an IP telephony system 281. The IP telephony system can communicate using an H.323 standard or SIP.

Embodiments of the present invention relate to data communications via one or more networks. The data communications can be carried by communications channels of the one or more networks. A network can include wired communication links (e.g., coaxial cable, copper wires, optical fibers, and so on), wireless communication links (e.g., satellite communication links, terrestrial wireless communication links, wireless LANs, and so on), or a combination thereof.

Softswitch 430 can include an Application Programming Interface ("API") 435, which can be a Java Telephony API ("JTAPI"), a SIP API, a Java AIN API ("JAIN"), a combination thereof, and so on. Softswitch 430 can also include a one or more protocol stacks such as an SS7 protocol stack 431, a MCGP/Megaco protocol stack 432, an H.323 protocol stack 433, a SIP protocol stack 434, and so on. Using the one or more protocol stacks, the softswitch 430 can perform generalized call processing for each of the protocol stacks, and calls and services can be delivered to a POTS telephone using the SS7 protocol stack, to an H.323 device using the H.323 protocol stack, to a SIP phone using the SIP protocol stack, and so on.

In accordance with an embodiment of the present invention, a converged service creation environment is provided. Known softswitches typically include a call processing engine that is based largely on a PSTN domain call processing engine and that handles only narrow band services. For example, PSTN domain call processing includes sending signaling messages on one or more SSPS, circuit creation and determining whether there is a call reject, no response, busy indication, etc. In an embodiment of the present invention, signaling for converged services creation is provided. For example, to deliver a movie via a broadband network to a home networking environment, the signaling involved can include notifying two parties such as the source of the movie and the destination of the movie, determining the IP address of the movie source, determining the IP address of the movie destination, and allocating of resources to stream the movie from the source to the destination.

To provide a converged services creation environment, softswitch 430 can be coupled to a service session manager 400 via a converged services creation and execution environment ("CSCE") messaging bus 440. CSCE messaging bus 440 can be a Common Object Request Broker Architecture ("CORBA") bus, Remote Method Invocation ("RMI") bus, a JINI bus, a combination thereof, and so on. The service session manager 400 can be part of a converged service creation and execution platform that includes one or more open APIs 410 and an Application Server 420. Application Server 420 can be a UNIX-based server, a Microsoft Windowst® NT server, and so on. In an embodiment, the service session manager 400 is coupled via the CSCE bus 440 to a server farm including one or more service servers. For example, the server farm can include one or more of a third party information server 441, a Wireless Application Protocol ("WAP") server 442, a home networking server 443, an e-mail server 444, a messaging server 445, a directory server 446, an Operation Administration Maintenance and Provisioning ("OAMP")/billing server 447, a voice recognition server 448, a text-to-speech server 449, a facsimile ("fax") mail server 450, a voice mail server 451, a conference server 452, a media server 453, a Quality-of-Service ("QoS")/Policy server 454, a combination thereof, and so forth. The service servers of the server farm can also be coupled to the data network 250 and communicate with the data network 250 using RTP communications, RTCP communications, and so forth.

In an embodiment, a server (e.g., an application server, a service server, an application service server, a network resource server) includes a processor and a memory. A processor can be, for example, an Intel Pentium® IV processor, manufactured by Intel Corp. of Santa Clara, Calif. As another example, the processor can be an Application Specific Integrated Circuit (ASIC). A server can be, for example, a UNIX server from Sun Microsystems, Inc. of Palo Alto, Calif. Memory may be a random access memory (RAM), a dynamic RAM (DRAM), a static RAM (SRAM), a volatile memory, a non-volatile memory, a flash RAM, a cache memory, a hard disk drive, a magnetic storage device, an optical storage device, a magneto-optical storage device, or a combination thereof. The memory of the server can store a plurality of instructions adapted to be executed by the processor.

Servers of the server farm can be application service provider ("ASP") servers that at least in part can provide services to users (e.g., subscribers, customers, etc.). The servers of the server farm can also include applications that, for example, manage aspects of delivery of services to the users. Thus, a QoS/Policy server 454 can include an application that manages providing a quality of service for delivery of an application such as a media application from media server 453. As another example, OAMP/billing server 447 can provide a billing application that manages billing related to delivery of an application such as e-mail from e-mail server 444, messages from messaging server 445, voice mail from voice mail server 451, conference services from conference server 452, and so on.

A customer profile database 401 and a service profile database 402 can also be coupled to the CSCE bus 440. The customer profile database 401 can store customer profile information such as customer name, customer service delivery information (e.g., mobile phone number, landline phone number, IP phone IP address, home networking IP address, and so forth), customer billing information, and services to which the customer has subscribed. The service profile database 402 can store service profile information about the various services to which a customer can subscribe. For example, the customer profile database can include a data record corresponding to a customer, where the data record identifies the customer as a subscriber of a media service and includes the customer's IP address for delivery of media application. The service profile database 402 can include information about the media service to which the customer has subscribed, such as information that identifies media applications of media server 453 to which the customer has subscribed.

Each of customer profile database 401 and service profile database 402 can be accessed by application server 420 of the service session manager 400. Application server 420 can store applications that interface with customers to manage delivery of application services provided at least in part by one or more of the service servers of the server farm. For example, application server 420 can include a generic media delivery application that can be accessed by a customer to specify delivery of one or more media services. The generic media delivery application can include specific interfaces that interface with the media applications of media server 453.

The service session manager 400 of application server 420 thereby provides for a modularized converged services creation and execution environment. A modularized environment can allow a service provider greater latitude in assembling a converged services creation and execution environment. Known providers of applications typically provide a unified application solution, i.e., an integrated application solution. For example, Cisco Systems of San Jose, Calif. can provide service providers with a unified messaging solution. Unified application solutions, however, are typically a proprietary solution aimed at a broad range of service providers and are not particularly designed for any particular service provider. Thus, while a service provider may ultimately select a unified application solution as the best amongst a plurality of unified application solutions, that unified application solution may not be optimized for the service provider's environment. Modularizing the delivery of application services in a converged services creation and execution environment can allow a service provider to implement discrete application solutions instead of implementing a service provider's unified application solution.

In an embodiment of the present invention, service session manager 400 can also include an open API 410 that can provide one or more open application programming interfaces to one or more web-based applications 462, which a customer can access via a portal 466. Examples of web-based applications 462 can include click-to-dial, click-to-show, click-to-conference, and so on. In another example, a web-based service providing the subscriber services management application can allow a subscriber to select and configure services provided by the service provider. A customer can access the portal via a network (e.g., the Internet) and can subscribe to a personal call management service that can include fax messaging, e-mail messaging, call messaging, and so on. The fax messaging service can allow a customer to indicate that a fax received from a particular fax number should be converted to an e-mail attachment and e-mailed to a particular e-mail address. As another example, the subscriber might specify to the call messaging service that a call received during a certain time period and/or from a certain telephone number should be blocked, or forwarded to a voice mail messaging system, or forwarded to a mobile telephone number, and so on. A further example can include specifying that an e-mail message from a particular sender and/or regarding a certain topic should be forwarded to a mobile phone number after a text-to-speech application has converted the e-mail message to a spoken message. In a still further example, a voice mail message can be converted to a text message and included in an e-mail to be sent to a specified e-mail address. These examples are merely illustrative of the types of applications that can be provided via a portal coupled to a CSCE.

In another embodiment of the present invention, open API 410 of service session manager 400 can include one or more open application programming interfaces to one or more E-center service applications 466 of an e-Center 465. For example, an e-Center 465 can include a call center that handles customer service calls and data processing. In an embodiment, an e-Center 465 can handle voice calls, voice mail messages, messaging, video calls, and other types of customer service communications.

Service session manager 400, in an embodiment, can manage delivery of services to and from network devices (e.g., customer data devices) coupled to a home networking system 490. Examples of network devices coupled to home networking system 490 include IP appliances (i.e., IP devices) such as an IP telephone 281, an IP-based refrigerator, an IP-based audio entertainment system, an IP-based microwave, an IP-based home theater, IP-based home security devices, IP-based video monitoring (e.g., babysitting monitoring, nanny monitoring, child monitoring, etc.), and so on. The home networking system can include a residential gateway 491 that can communicate with service session manager 400 for delivery of services. Operation of the IP appliances can be configured directly via the respective IP appliance or indirectly via the residential gateway 491. For example, operation of an IP-based alarm system can be configured to notify not only an alarm company (e.g., a monitoring center) and/or a law enforcement authority, but also an owner and/or resident of the alarmed property via an e-mail address, a voice mail message, a text message, and so on. The owner and/or resident of the alarmed property can configure operation of the IP-based alarm system with respect to delivery of status information (e.g., alarms, operational status, and so on).

According to an embodiment of the present invention, the network appliances that can communicate with the service session manager 400 for the delivery of services can include an embedded local agent that communicates with service session manager 400. The embedded local agent can be a user applet that is downloaded to an IP device. In another embodiment, the embedded local agent can be downloaded to a residential gateway that is coupled to an IP device. In a further embodiment, the embedded local agent can be downloaded to a PC.

The service session manager 400, in an embodiment, can behave as a service broker among application servers, client devices (e.g., IP appliances), and converged services. Traditionally disjointed front-end systems (e.g., Web, call center, e-mail, fax, etc.) can be integrated by the service session manager 400. The service session manager 400 can present a unified infrastructure for customer-centric service creation and execution. Service session management and control is provided by the service session manager 400, and the service session manager 400 can include a common API to allow converged service creation and execution. The service session manager 400 can also provide capability controls for application servers and client devices (e.g., IP devices) and provide a portability layer to insulate the converged service creation environment form vendor-specific APIs. The softswitch 430 can act as a voice-oriented communication server and bridge PSTN and IP domains for call processing. In an embodiment, the softswitch 430 can provide connectivity control for IP devices to access network resources and services.

The server farm (e.g., one or more servers 441-454) coupled to the service session manager 400 via the CSCE messaging bus 440 can include network resource servers. For example, messaging server 445 can be a network resource server. As another example, media server 453 can be a network resource server. The network resource servers can include self-contained service modules which register themselves with the service session manager 400. The network resource servers can make services available to the CSCE via COBRA, RMI or JINI technology and can be technologically transparent to the CSCE. In an embodiment of the present invention, the AIN service creation and execution platform (e.g., SCP 272) is able to interact with the CSCE via TCP/IP or other suitable communications protocols.

Figure 5:
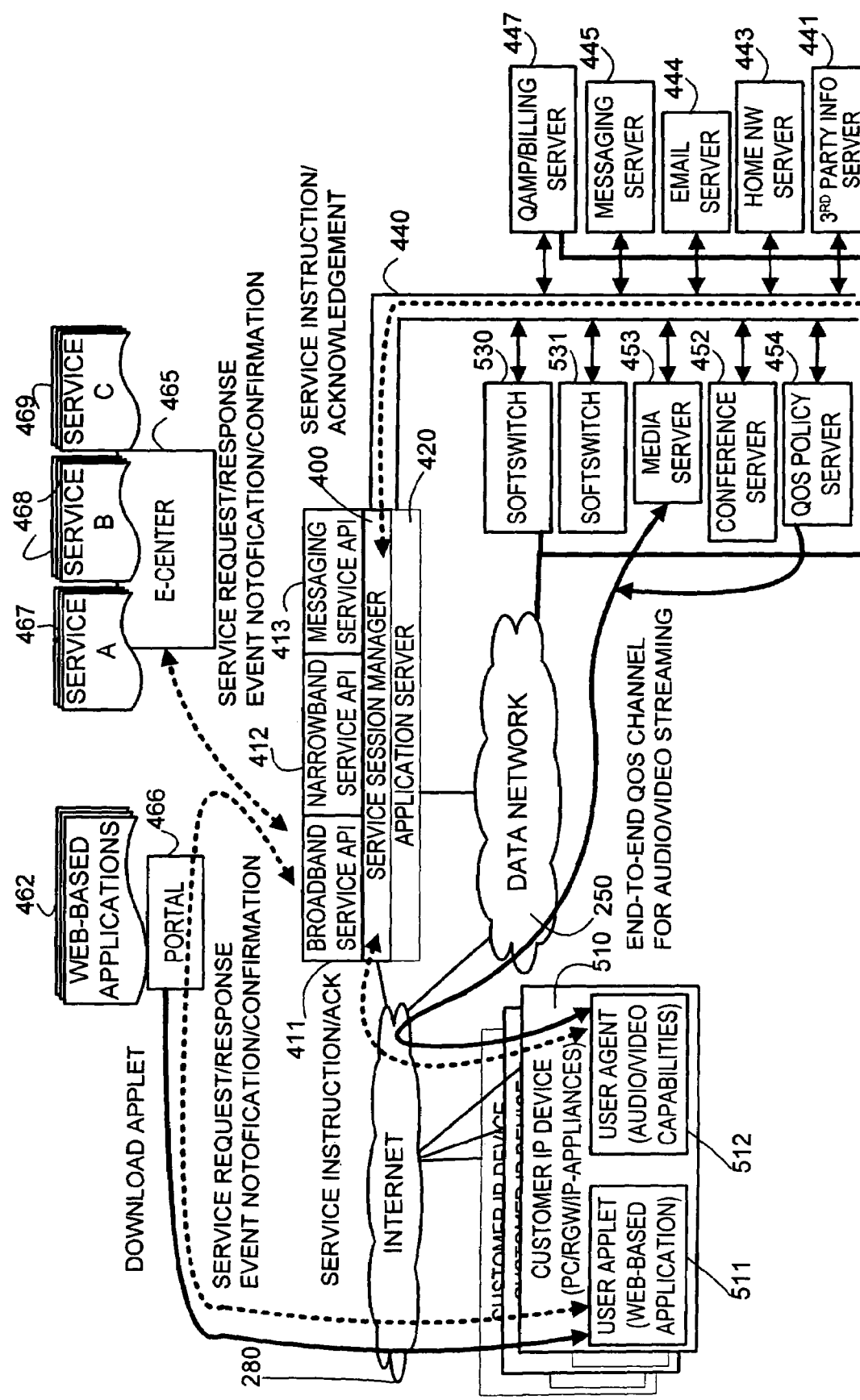
FIG. 5 illustrates an embodiment of a converged service creation and execution environment for a broadband service between a media server and a customer IP device.

FIG. 5 shows another illustration of an embodiment of the present invention. Service session manager 400 can include a plurality of open APIs, including an open broadband service API 411, an open narrowband service API 412, and an open messaging service API 413. In the embodiment illustrated in FIG. 5, softswitches 530 and 531 can be network resource servers of a server farm. For example, softswitch 530 can include a Java Telephony API ("JTAPI"), and softswitch 531 can include a SIP API. Service session manager 400 can communicate via CSCE messaging bus 440 with the network resource servers of the server farm (e.g., servers 530-531, 441, 443-45, 447, 452-54).

The service session manager 400 can also communicate with customer IP devices 510. A customer IP device 510 can be a PC, a residential gateway, an IP appliance, and so forth. A customer IP device 510 can include a user applet 511 and a user agent 512. A user applet 511 can be downloaded from a web-based application server (e.g., after delivery of a service has been ordered, during a setup of customer IP device 510, etc.). The user applet 511 can interact with an end user to collect the end user's service request, pass the service request to the service manager, and display the result of the service request processing to the end user.

User agent 512 can manage delivery of an application service to the customer IP device 510. For example, when the IP device 510 is an audio-video device, the user agent 512 can manage receipt of audio-video data and instructions. Examples of other user agents 512 include an instant messaging user agent, a unified messaging user agent, an always-on user agent, and so on.

FIG. 5 illustrates an embodiment of a converged service creation and execution environment for an end-to-end QoS channel for audio/video steaming between a media server and a customer IP device. A service request from customer IP device 510 can be sent via portal 466 to broadband service API 411, and a service response based in part on the service request can be generated and transmitted to the customer IP device 510. User applet 511 can be downloaded to customer IP device 510 and can communicate with user agent 512 regarding the service request/response. User agent 512 can receive a service instruction from service session manager 400, and service session manager 400 can communicate another service instruction to the media server 453 and QoS policy server 454 of the server farm via CSCE messaging bus 440. The media server 453 and QoS policy server 454 can return one or more service acknowledgements to service session manager 400, and service acknowledgements can be received from the user agent 512 of customer IP device 510. In an embodiment, an event notification can be sent to the user applet 511 from broadband service API 411 via portal 566, and an event confirmation can be returned from the user applet 511 to the broadband service API 411. In another embodiment, the service request/response and the event notification/confirmation are communicated in part by e-Center 465. As a result, an end-to-end quality of service (QoS) channel for audio/video streaming can be established between customer IP device 510 and media server 453.

Figure 6:
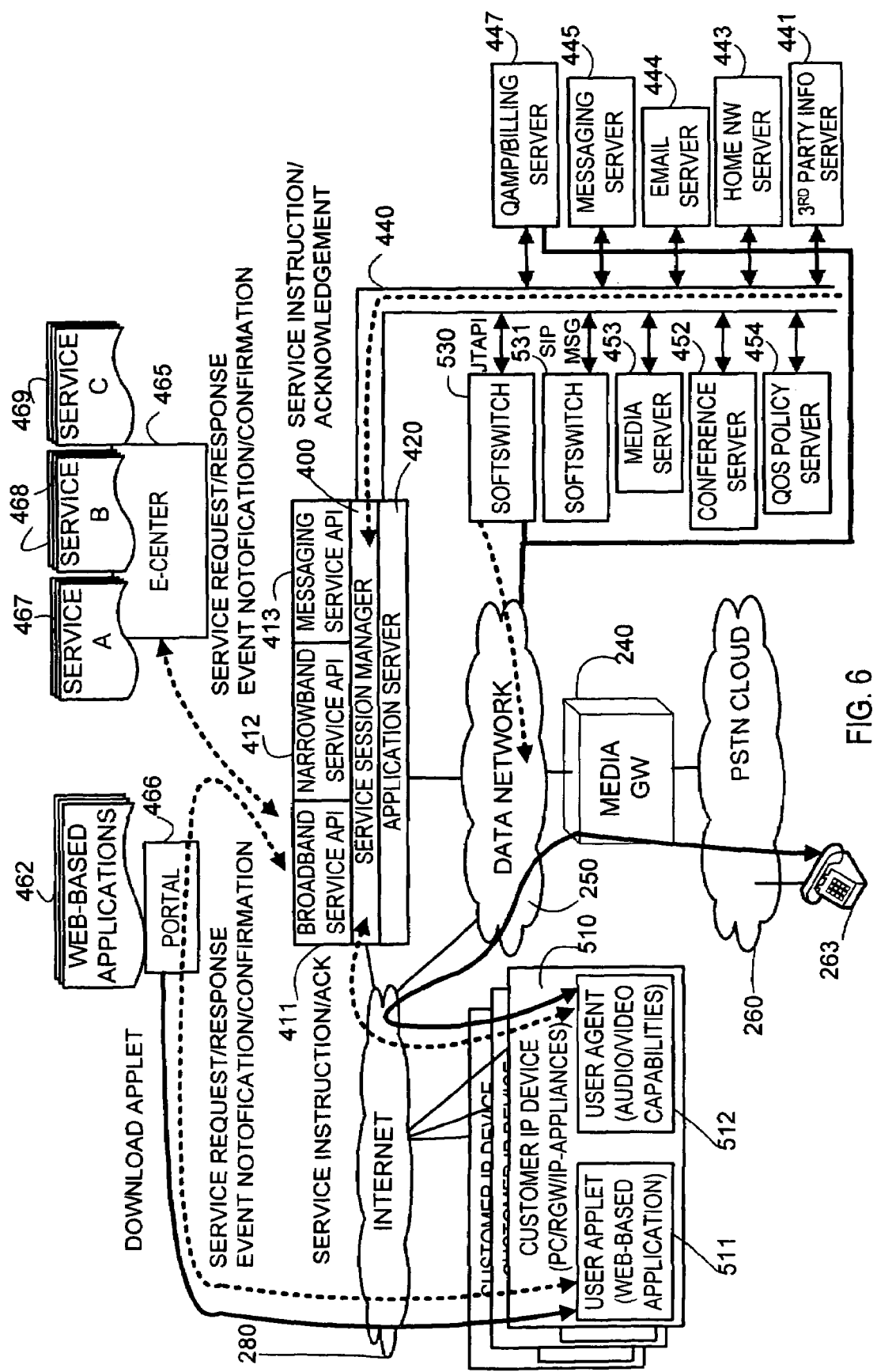
FIG. 6 illustrates an embodiment of a converged service creation and execution environment for a narrowband service between a telephone and customer IP device.

FIG. 6 illustrates an embodiment of a converged service creation and execution environment for a narrowband service between a telephone and a customer IP device. A service request from customer IP device 510 can be sent via portal 466 to narrowband service API 412, and a service response based in part on the service request can be generated and transmitted to the customer IP device 510. User applet 511 can be downloaded to customer IP device 510 and can communicate with user agent 512 regarding the service request/response. User agent 512 can receive a service instruction from service session manager 400, and service session manager 400 can also communicate another service instruction to, for example, one of softswitch 530 and softswitch 531 of the server farm via CSCE messaging bus 440. In an embodiment, softswitch 530 can return a service acknowledgement to service session manager 400, and another service acknowledgement can be sent from the user agent 512 of customer IP device 510. In an embodiment, an event notification can be sent to the user applet 511 from narrowband service API 412 via portal 466, and an event confirmation can be returned from the user applet 511 to the narrowband service API 412. In another embodiment, the service request/response and the event notification/confirmation are communicated in part by e-Center 465. As a result, a narrowband service can be created and managed between telephone 263 and customer IP device 510.

Figure 7:
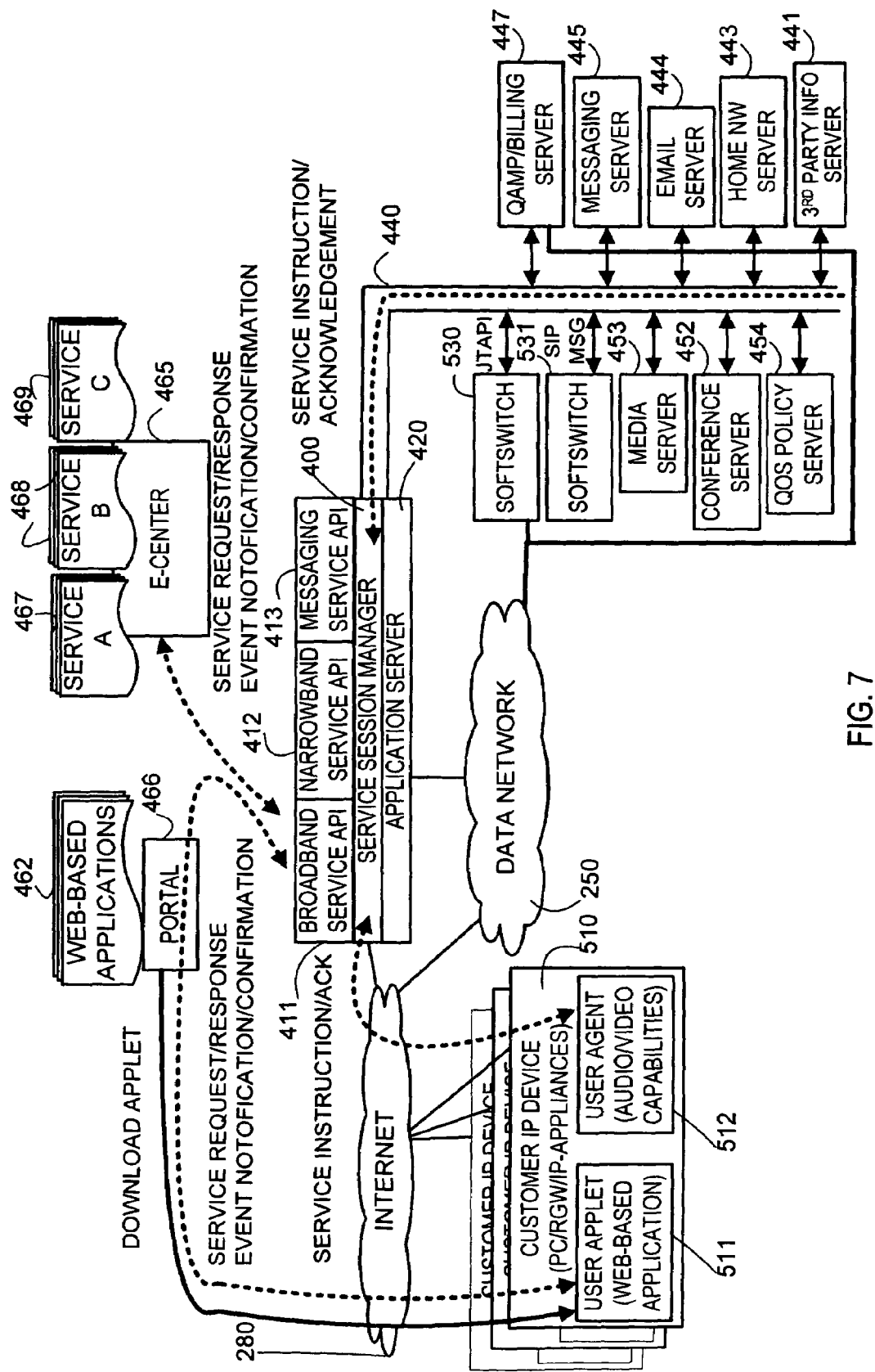
FIG. 7 illustrates an embodiment of a converged service creation and execution ("CSCE") environment for a messaging services from and to a customer IP device.

FIG. 7 illustrates an embodiment of a converged service creation and execution environment for a messaging service from and to a customer IP device. A service request from customer IP device 510 can be sent via portal 466 to messaging service API 413, and a service response based in part on the service request can be generated and transmitted to the customer IP device 510. User applet 511 can be downloaded to customer IP device 510 and can communicate with user agent 512 regarding the service request/response. User agent 512 can receive a service instruction from service session manager 400, and service session manager 400 can communicate the service instruction to, for example, one of a plurality of messaging service servers such as voice mail server 445, email server 444, and fax mail server 443 via CSCE messaging bus 440. In an embodiment, the voice mail server 445, email server 444, or fax mail server 443 can return a service acknowledgement to service session manager 400, and another service acknowledgement can be received from the user agent 512 of customer IP device 510. In an embodiment, an event notification can be sent to the user applet 511 from messaging service API 413 via portal 466, and an event confirmation can be returned from the user applet 511 to the messaging service API 413. In another embodiment, the service request/response and the event notification/confirmation are communicated in part by e-Center 465. As a result, a messaging services can be created and managed between a messaging service server of a server farm (e.g., one of voice mail server 445, email server 444, or fax mail server 443) and customer IP device 510.

In accordance with embodiments of the present invention, a CSCE environment can be a fully distributed architecture which bridges applications, network resource servers, and end-user devices. It can provide a common service control platform to allow an application to control network resource servers and end user integrated access devices ("IADs") (e.g., a residential gateway, an ADSL modem; etc.) for converged services delivery through open APIs. Commercial off-the-shelf ("COTS") server technology can be used to allow growing server farms quickly, evolving server technology smoothly, and providing converged services in a seamless manner. A plurality of extensible open APIs can be utilized where each extensible open API can target a different service characteristic (e.g., broadband, narrowband, messaging, and so forth). In an embodiment, an internal API for controlling resource servers and user agents can be embedded in an IAD or a residential gateway. The internal APIs may be Open Services Gateway Initiative ("OSGi") compliant. The CSCE architecture can be compatible with NGN QoS on demand infrastructure and provide support for flexible billing on a per use basis.

Figure 8:
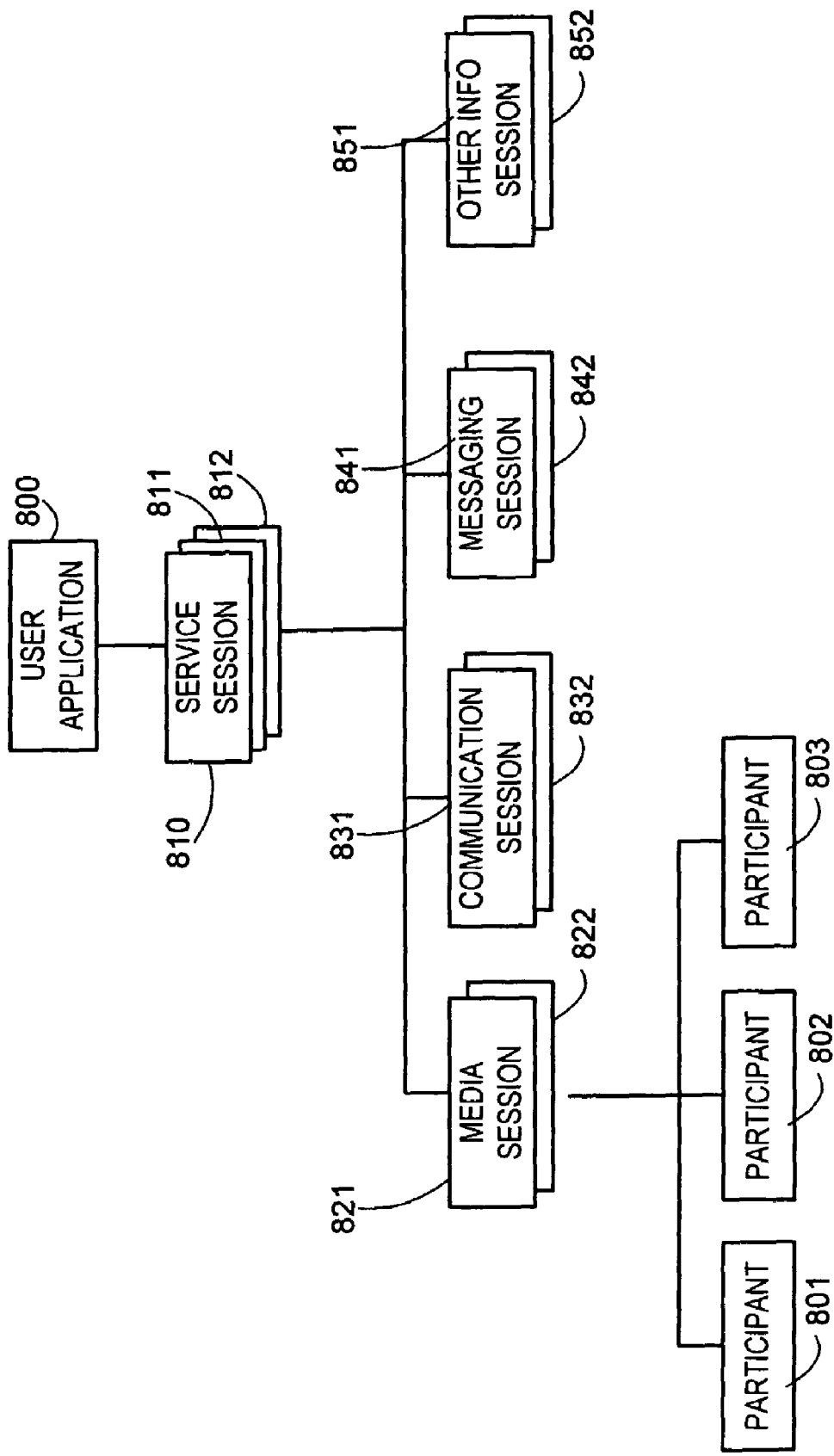
FIG. 8 shows an embodiment of a CSCE service session model.

FIG. 8 shows an embodiment of a CSCE service session model. A user application 800 can create multiple service sessions 810, 811, and 812. Examples of a user application 800 include audio streaming, video streaming, voice chat, and online chat. Each of service sessions 810-812 can contain multiple different sub-sessions, such as media sessions 821 and 822, communication session 831 and 832, messaging session 841 and 842, and/or other information sessions 851 and 852. For example, a service session 810 can have a media session 821 having a first session identifier, a communication session 831 having a second session identifier, a messaging session 841 having a third session identifier, and another information session 851 having a fourth session identifier. In an embodiment, each sub-session may have multiple participants 801, 802, and 803. The CSCE environment allows for billing of services at different levels of granularity such as customer characteristics, session characteristics, sub-session characteristics, and participant characteristics. In an embodiment, the CSCE environment is flexible, scalable, and straightforward to implement and expand. It can support multiple service sessions for each user, different types of working sessions for each service session, and multiple participants for each working session.

Figure 9:
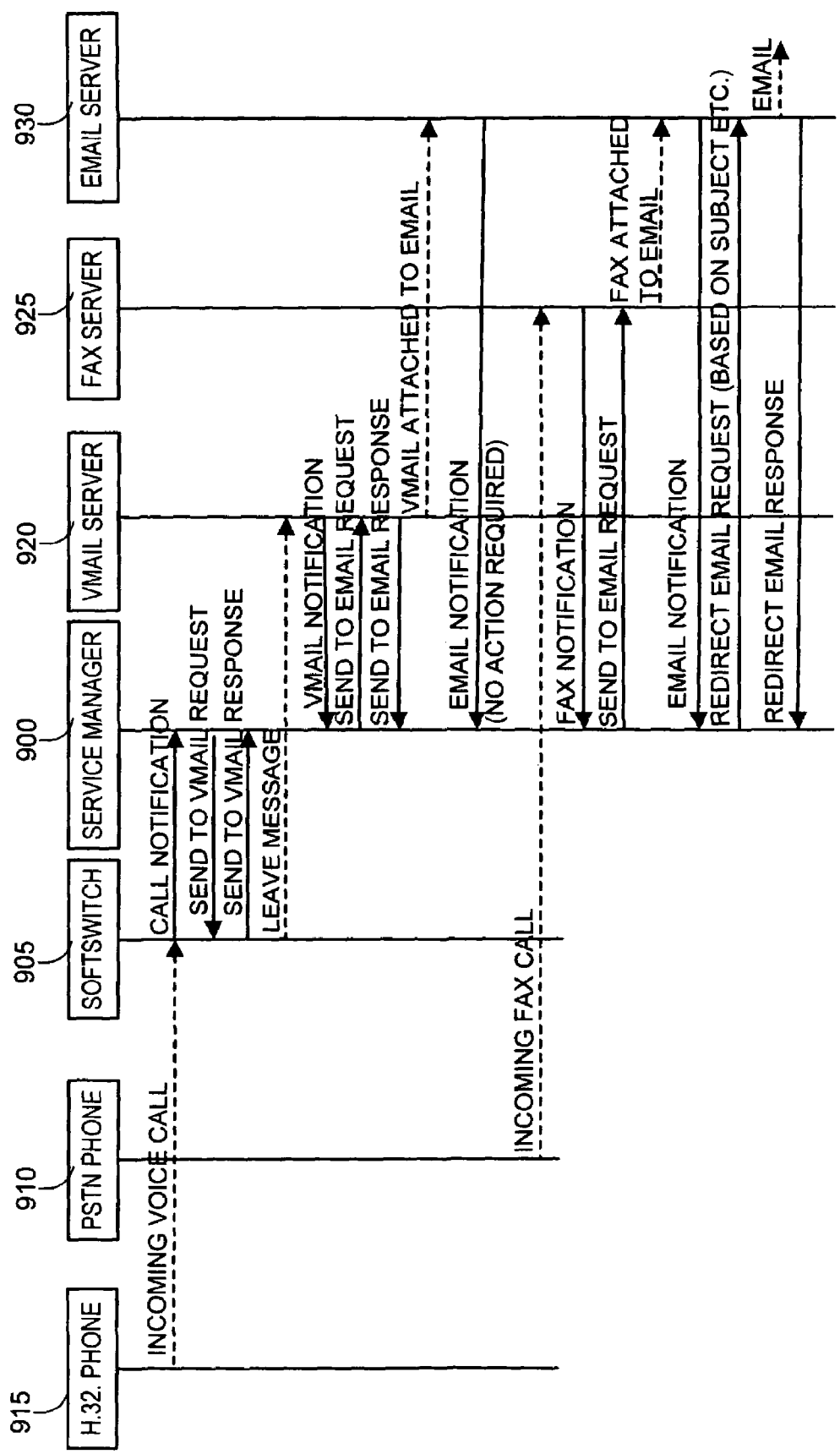
FIG. 9 is an illustration of CSCE messaging operations in accordance with an embodiment of the present invention.

FIG. 9 is an illustration of CSCE messaging operations in accordance with an embodiment of the present invention. An incoming voice call associated with H.323 phone 915 is processed at least in part by softswitch 905, and softswitch 905 sends a call notification to service manager 900. The service manager 900 generates and sends a send to voice mail request to the softswitch 905 (e.g., when the called party's phone is busy, the called party has directed incoming calls to voice mail, etc.). The softswitch 905 then sends a send to voice mail response to service manager 900 and directs the incoming voice call to voice mail server 920. After receiving at least a part of a voice mail message, the voice mail server 920 can send a voice mail notification message to service manager 900, and the service manager 900 can generate a send voice mail message to e-mail request to voice mail service 920 (e.g., based at least in part on a user profile, user instructions, and so forth). The voice mail server 920 can send a send voice mail message to e-mail response to service manager 900 and send the voice mail message as an attachment to an e-mail to e-mail server 930. The e-mail server 930 can send an email notification message to service manager 900, and the service manager 900 may process the e-mail notification and determine that no action based on the e-mail notification is required (e.g., according to a user profile or user instructions).

An incoming fax call associated with PSTN phone 910 can be received by fax server 925. Fax server 925 can send a fax notification to service manager 900, and based at least in part on a user profile in an embodiment, service manager 900 can generate and send a send fax to e-mail request to fax server 925. The fax server 925 can attach the received fax to an e-mail message and send the e-mail message to e-mail server 930. The e-mail server 930 can send an e-mail notification to service manager 900, and in an embodiment based at least in part on a user profile the service manager 900 can send a redirect e-mail request to e-mail server 930. For example, a user profile can specify that e-mail having certain characteristics (e.g., subject, sender, date/time) be redirected to a different destination (e.g., e-mail address, fax address, etc.). The e-mail server 930 can redirect the e-mail message and send a redirect e-mail response to service manager 900.

In an embodiment, CSCE messaging can converge messaging resources and events (e.g., voice calls, voice mail, e-mail, personal financial messages, home security messages, and so on) into a messaging service. Different types of messaging resources can interact with each other under a predefined service logic. Service providers and/or subscribers can modify services (e.g., subscribe, unsubscribe) via a web interface by specifying messaging resources. For example, a service provider and/or subscriber can use a web-based service logic definition interface to define and/or modify a service logic on-line for each individual messaging resource. In an embodiment, a rule/policy-based service logic processing engine can be part of the CSCE messaging operations. In another embodiment, flexible billing on a per use basis can be provided.

Figure 10:
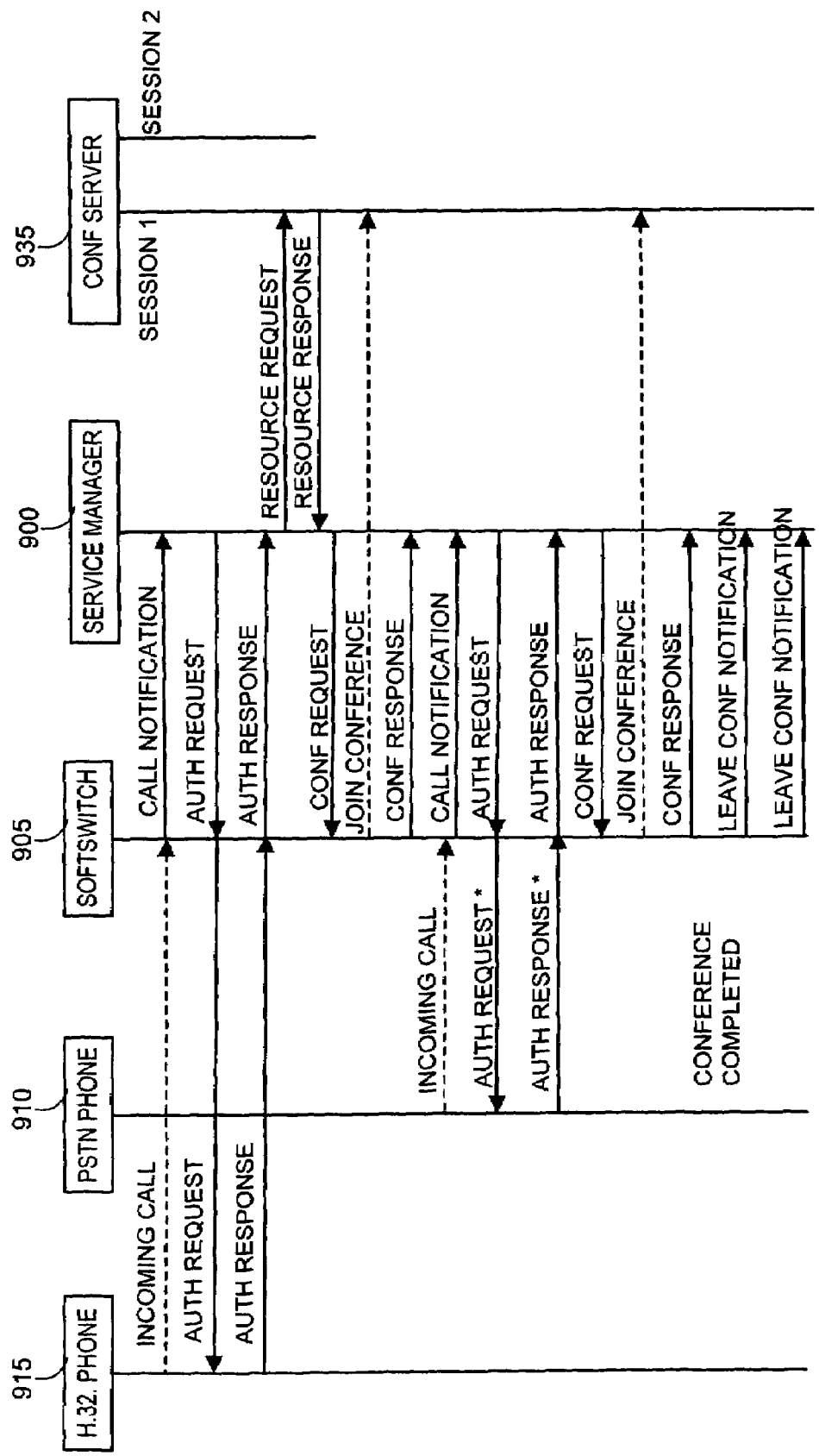
FIG. 10 shows an illustration of CSCE conferencing operations in accordance with an embodiment of the present invention.

FIG. 10 shows an illustration of CSCE conferencing operations in accordance with an embodiment of the present invention. In an embodiment, an incoming call associated with H.323 phone 915 is processed at least in part by softswitch 905, and softswitch 905 sends a call notification to service manager 900. The service manager 900 sends an authorization request to softswitch 905, and the authorization request is sent to the H.323 phone 915. The H.323 phone generates and sends an authorization response to softswitch 905, and the authorization response is then sent to service manager 900. Service manager 900 generates and sends a resource request to conference server 935, which returns a resource response to service manager 900. The service manager 900 then sends a conference request to softswitch 905, which directs the incoming call associated with the H.323 phone 915 to the conference server 935 to join the conference related to session 1 and sends a conference response to service manager 900.

An incoming call associated with a PSTN phone 910 can be processed at least in part by softswitch 905, which can send a call notification to service manager 900. The service manager 900 can generate and send an authorization request to softswitch 905. Depending on the capabilities of PSTN phone 910, the softswitch 905 may send an authorization request to, and receive an authorization response from, PSTN phone 910. The softswitch 905 can send an authorization response to service manager 900, and service manager 900 can generate and send a conference request to softswitch 905. The softswitch 905 can then direct the incoming call associated with PSTN phone 910 to conference server 935 to join the conference related to session 1 and send a conference response to the service manager 900. When the calls associated with the H.323 phone and the PSTN phone leave the conference, softswitch 905 can send leave conference notifications to the service manager 900. Session 2 shown in FIG. 10 may be a session related to a different conference being managed according to the present invention.

In an embodiment, the CSCE conferencing operations can allow service subscribers to schedule and conduct a web-based conference call. It can allow different types of users from the PSTN domain and the IP domain (e.g., H.323 phone users, PSTN phone users, SIP phone users, and so forth) to participate in the same conference. In an embodiment, video capability and/or flexible billing mechanisms can be supported.

Figure 11:
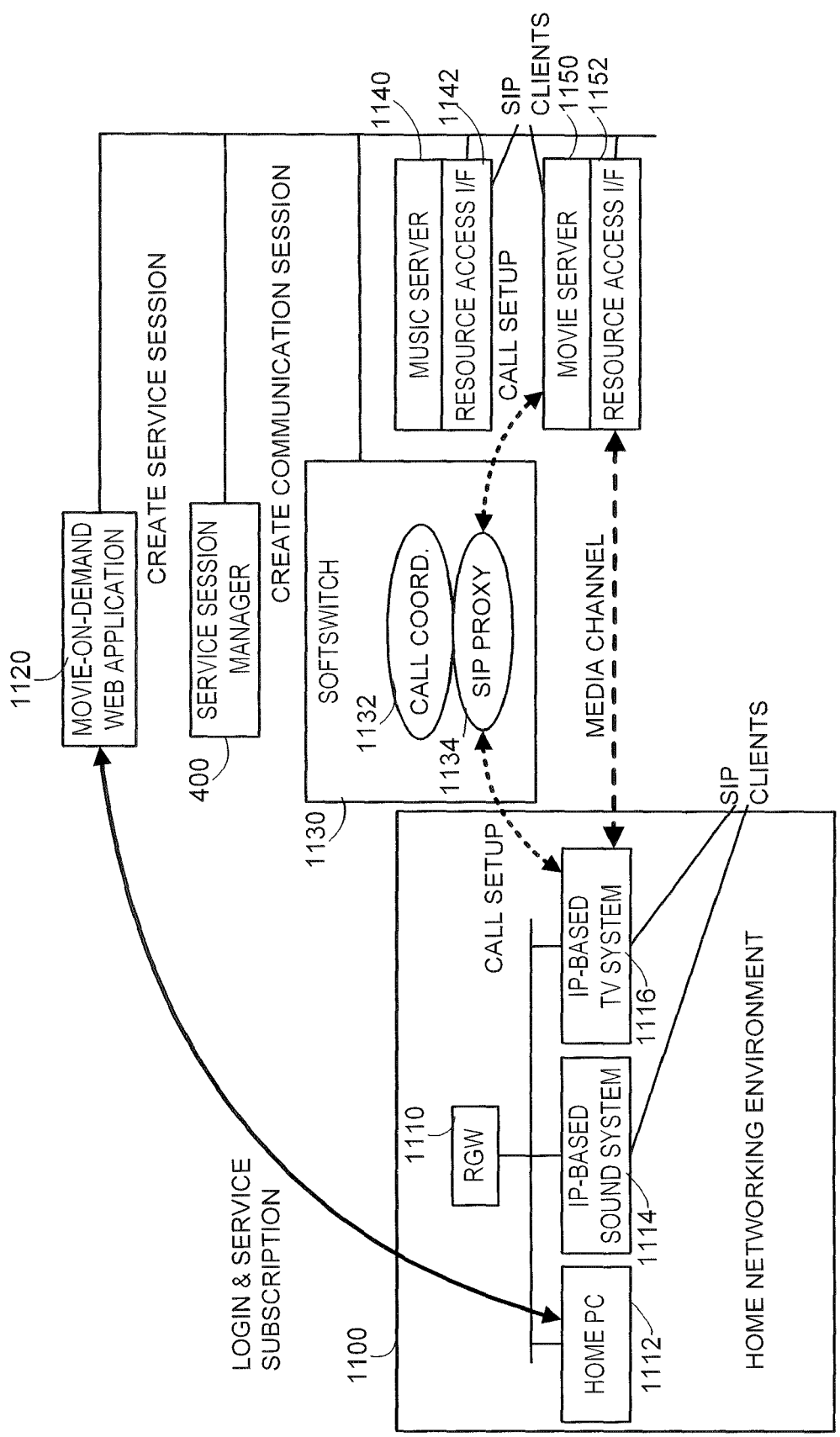
FIG. 11 shows an embodiment of a CSCE environment providing multimedia on demand services.

FIG. 11 shows an embodiment of a CSCE environment providing multimedia on demand services. In the embodiment illustrated in FIG. 11, the CSCE multimedia on demand environment includes softswitch support. A home networking environment 1100 can include a residential gateway 1110 coupled to a home PC 1112, an IP-based sound system 1114, and an IP-based television system 1116. The home PC 1112 can communicate with a movie-on-demand web application 1120, e.g., via a network such as the Internet, a WAN, a LAN, and so on. The home PC 1112 can communicate login and service subscription information to the movie-on-demand web application 1120, and based at least in part on that login and service subscription information the movie-on-demand web application 1120 can communicate with service session manager 400 to create a service session. Alternatively a set-top device could be used to provide login and subscription information. The service session manager 1100 can then direct establishment of a communication session via softswitch 1130, where the softswitch 1130 can include call coordination logic 1132 and SIP Proxy logic 1134. Call setup information can be communicated between IP-based television system 1116 and movie server 1150 via softswitch 1130, where the movie server 1150 includes a resource, access interface 1152. A media channel can then be established between the movie server 1150 and the IP-based television system 1116. In an embodiment, the movie server 1150 is a SIP client. A music server 1140 (having resource access interface 1142) is another example of a SIP client that can deliver a multimedia service as part of a CSCE multimedia on demand environment.

Figure 12:
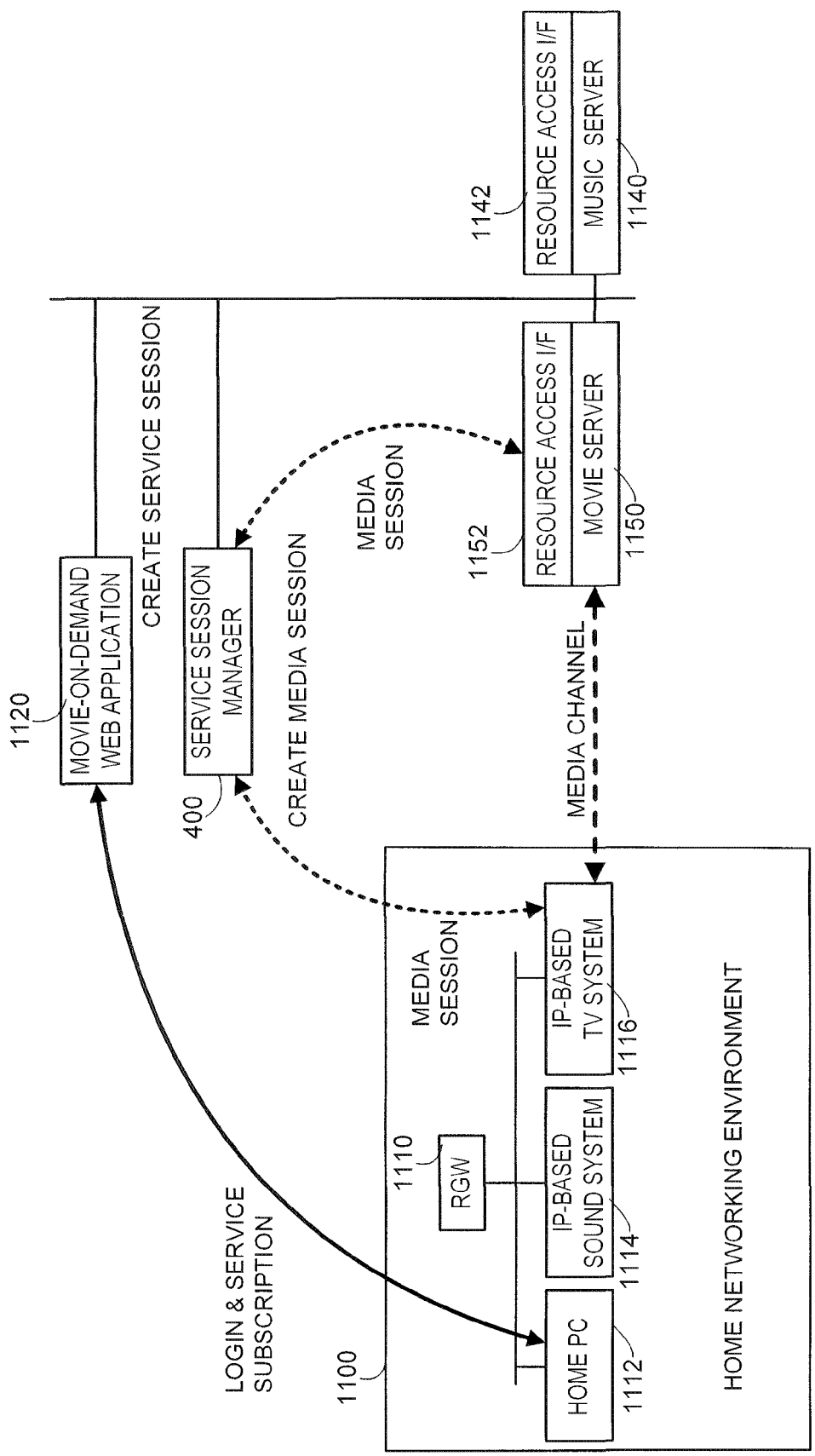
FIG. 12 shows another embodiment of a CSCE environment providing multimedia on demand services.

FIG. 12 shows another embodiment of a CSCE environment providing multimedia on demand services. In the embodiment illustrated in FIG. 12, the CSCE multimedia on demand environment does not include softswitch support. The home PC 1112 can communicate login and service subscription information to the movie-on-demand web application 1120, and based at least in part on that login and service subscription information the movie-on-demand web application 1120 can communicate with service session manager 1100 to create a service session. The service session manager 1100 can then establish a media session by communicating media session information between IP-based television system 1116 and movie server 1150. A media channel can thereby be established between the movie server 1150 and the IP-based television system 1116.

The CSCE multimedia on demand environment can allow service subscribers to select a multi-media content provider on-line and direct the multimedia (e.g., movie, music, and so forth) to a registered IP device such as IP-based television systems, IP-based sound systems, and so on. Embodiments of the present invention can deliver sophisticated applications in addition to movies on demand and music on demand. In an embodiment, the CSCE multimedia on demand environment can provide for flexible billing.

According to an embodiment of the present invention, a CSCE includes one or more APIs. In an embodiment, the APIs are open APIs. Open APIs of the CSCE can have multiple phases and be scalable and extensible. Embodiments of open APIs can be simple, lightweight, and designed for high performance. Moreover, the open APIs can support third party service development and follow industry API trends and standards. In an embodiment, the open APIs utilize distributed object computing technology and are vendor platform independent. Open APIs can be compatible with NGN QoS on demand infrastructure. In an embodiment, the APIs can be proprietary. In another embodiment, the APIs can be non-proprietary.

In an embodiment, a service session manager API can be structured as follows:

void registerUser (String userName, String userPasswd)
    void deregisterUser (String userName, String userPasswd)
    void registerUserAgent (String agentName, int agentType, UserAgentInf agent, String contactNumber)
    void deregisterUserAgent (String agentName)
    void registerMediaServer (String serverName, String serverType, MediaServerInf server)
    void deregisterMediaServer (String serverName)
    void registerConfServer (String serverName, String serverType, ConfServerInf server)
    void deregisterConfServer (String serverName).

In an embodiment, a broadband service API can be structured as follows:

int startServiceSession (String userName, String userpasswd, String ServiceID, int QoS)
    void endServiceSession (String userName, String userPasswd, int serviceSessionID)
    int startMediaTransmit (String[ ] receiverList, String fileName, int serviceSessionID)
    void endMediaTransmit (int serviceSessionID, int mediaSessionID, int userType)
    void addMediaTransmitUser (String userName, int serviceSessionID, int mediaSessionID)
    void removeMediaTransmitUser (String userName, int serviceSessionID, int mediaSessionID)
    int startAudioCall (String callerName, String calleeName, int serviceSessionID)
    void endAudioCall (int serviceSessionID, int mediaSessionID, int userType)

```
int startCameraTransmit (String senderName, String
    receiverName, int serviceSessionID)
void endCameraTransmit (int serviceSessionID, int medi-
    aSessionID, int userType)
int startAudioConf (String userName, String[ ] confPar-
    tyList, int serviceSessionID)
void endAudioConf (int serviceSessionID, int confSes-
    sionID, int userType)
void addAudioConfUser (String userName, int serviceS-
    essionID, int mediaSessionID)
void removeAudioConfUser (String userName, int ser-
    viceSessionID, int mediaSessionID)
```

A narrowband service API, in an embodiment, can provide narrowband voice oriented call processing capability and map the capability into a vendor specific softswitch API. For example, a narrowband service API can have the following structure:

```
int startAudioCall (String callerName, String calleeName,
    int serviceSessionID)
void endAudioCall (int serviceSessionID, int mediaSes-
    sionID, int userType)
int startAudioConf (String userName, String[ ] confPar-
    tyList, int serviceSessionID)
void endAudioConf(int serviceSessionID, int confSes-
    sionID, int userType)
void addAudioConfUser (String userName, int serviceS-
    essionID, int mediaSessionID)
void removeAudioConfUser (String userName, int ser-
    viceSessionID, int mediaSessionID)
```

In an embodiment, a converged messaging service API can provide messaging oriented event interaction and processing capability and converge different types of messaging sources into one common messaging processing platform.

Another broadband service API, in an embodiment, can be structured as follows:

```
int allocateMediaPort (int serviceSessionID, mediaSes-
    sionID)
void releaseMediaPort (int serviceSessionID, int medi-
    aSessionID)
void receiveMedia (MediaSession origAddr, MediaSes-
    sion destAddr, int sSessionID, int mSessionID)
void stopReceiveMedia (int serviceSessionID, int medi-
    aSessionID)
void transmitCamera (MediaSession origAddr, MediaSes-
    sion destAddr, int sSessionID, int mSessionID)
void stopTransmitCamera (int serviceSessionID, int medi-
    aSessionID)
```

Another narrowband service API, in an embodiment, can be structured as follows:

```
int makeAudioCall (String destAddr, int serviceSes-
    sionID)
void stopAudioCall (int serviceSessionID, int audioCal-
    lID)
int callNotification (String callerID, int serviceSessionID)
```

In an embodiment, a media server API, can have the following structure:

```
int[ ] allocateMediaPort (int numOfPorts, int serviceSes-
    sionID, mediaSessionID)
void releaseMediaPort (int[ ] portList, int serviceSes-
    sionID, int mediaSessionID)
void transmitMedia (String fileName. MediaSession[ ]
    origaddr, MediaSession[ ] destAddr, int serviceSes-
    sionID, int mediaSessionID)
void stopTransmitMedia (int serviceSessionID, int medi-
    aSessionID)
```

A conference server API, in an embodiment, can have the following structure:

```
int allocateAudioConfPort (int confSessionID)
void releaseAudioConfPort (int confSessionID)
void startAudioConf (int confPort, int confSessionID)
void stopAudioConf (int confSessionID)
void addAudioConfUser (String userID, int confSes-
    sionID)
void revomeAudioConfljser (String userID, int confSes-
    sionID)
```

Figure 13:
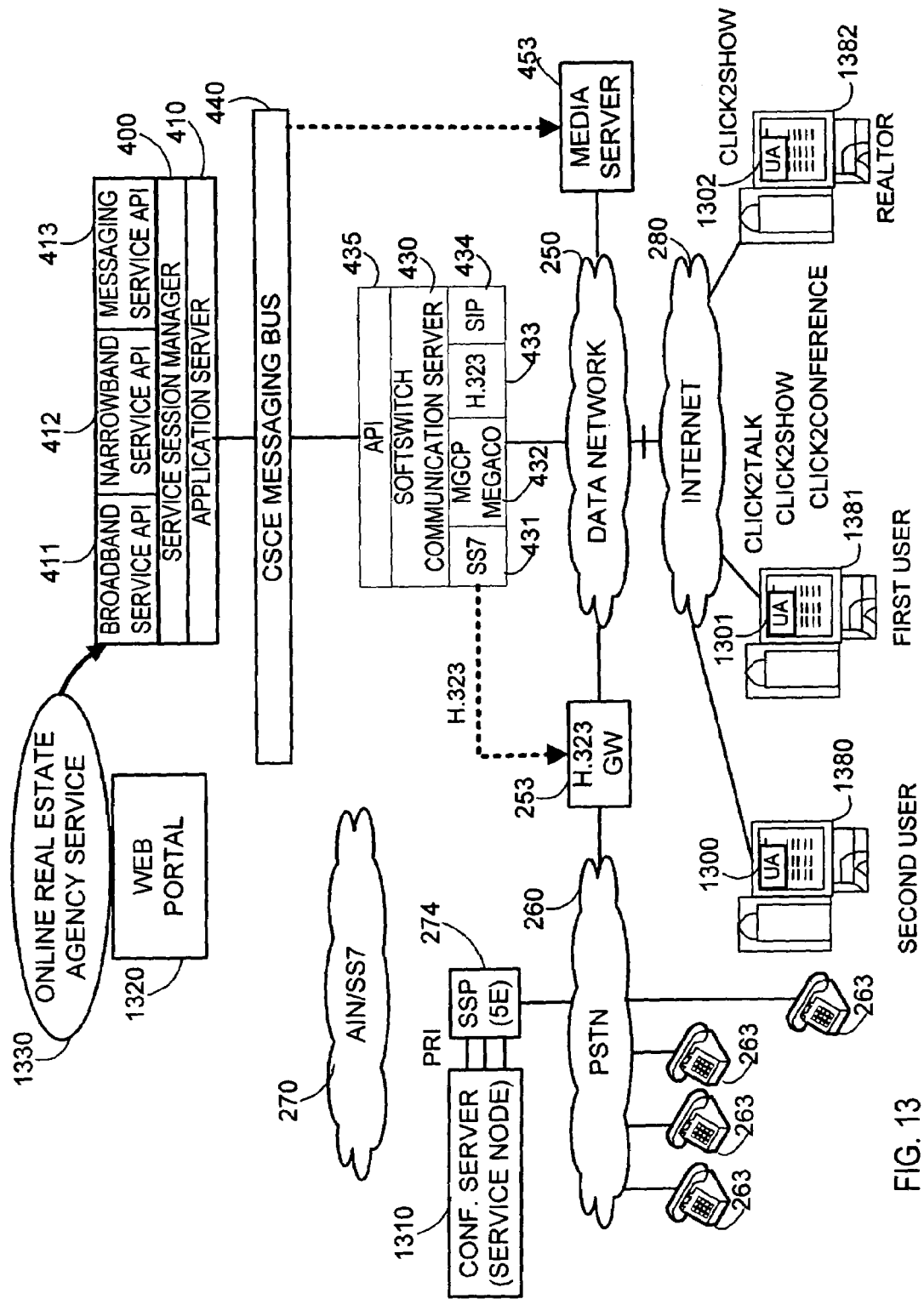
FIG. 13 shows an illustration of an embodiment of the present invention related to a demonstration application of an online real estate agency service.

FIG. 13 shows an illustration of an embodiment of the present invention. In the embodiment illustrated in FIG. 13, an example of a system in accordance with operations of an online real estate agency service within a CSCE is illustrated. An online real estate agency service 1330 can be accessible via a web portal 1320. In another embodiment, an online real estate agency service can be accessed via a URL.

A first user can search the Internet looking for a new house by using a multimedia PC 1381 that has IP telephony capabilities. The first user can find an interesting site, enter the site, and browse listings on one or more web pages. He can find an illustration of an interesting house on a web page and click a "Click2Show" button associated with the illustration of the house on the web page. A video window pops up on the video display of first user's PC 1381, and video clips of the house are shown in the video window. In an embodiment, the first user can talk to a live realtor about the house by clicking a "Click2Talk" button associated with the illustration of the house on the web page. A service request is sent to the application server 410 which can work with softswitch 430 to setup a call between the first user at PC 1381 and a realtor at PC 1382. After the call is setup and completed, the first user at PC 1381 can talk to the realtor at PC 1382. In an embodiment, the call can be a video call when PCs 1381 and 1382 have video call equipment and software. After some discussion, the realtor can show some video clips of other houses to the first user by clicking a "Click2Show" button so that the realtor and the first user can both see the house that the realtor is showing via video clips. The first user may want to invite a second user (e.g., a spouse of the first user) to join the discussion with the realtor. The first user can click a "Click2Conference" button and provide the phone number of the second user (e.g., a phone number of a PSTN phone 263, a phone number of an IP phone/PC 1380) After the call is setup and completed into the conference, the second user can talk to the first user and the realtor. For example, they can have some discussion and decide when to meet over the weekend to view the actual house. The call to the second user may comprise a video call when PCs 1380-1382 have video call equipment and software.

Figure 14:
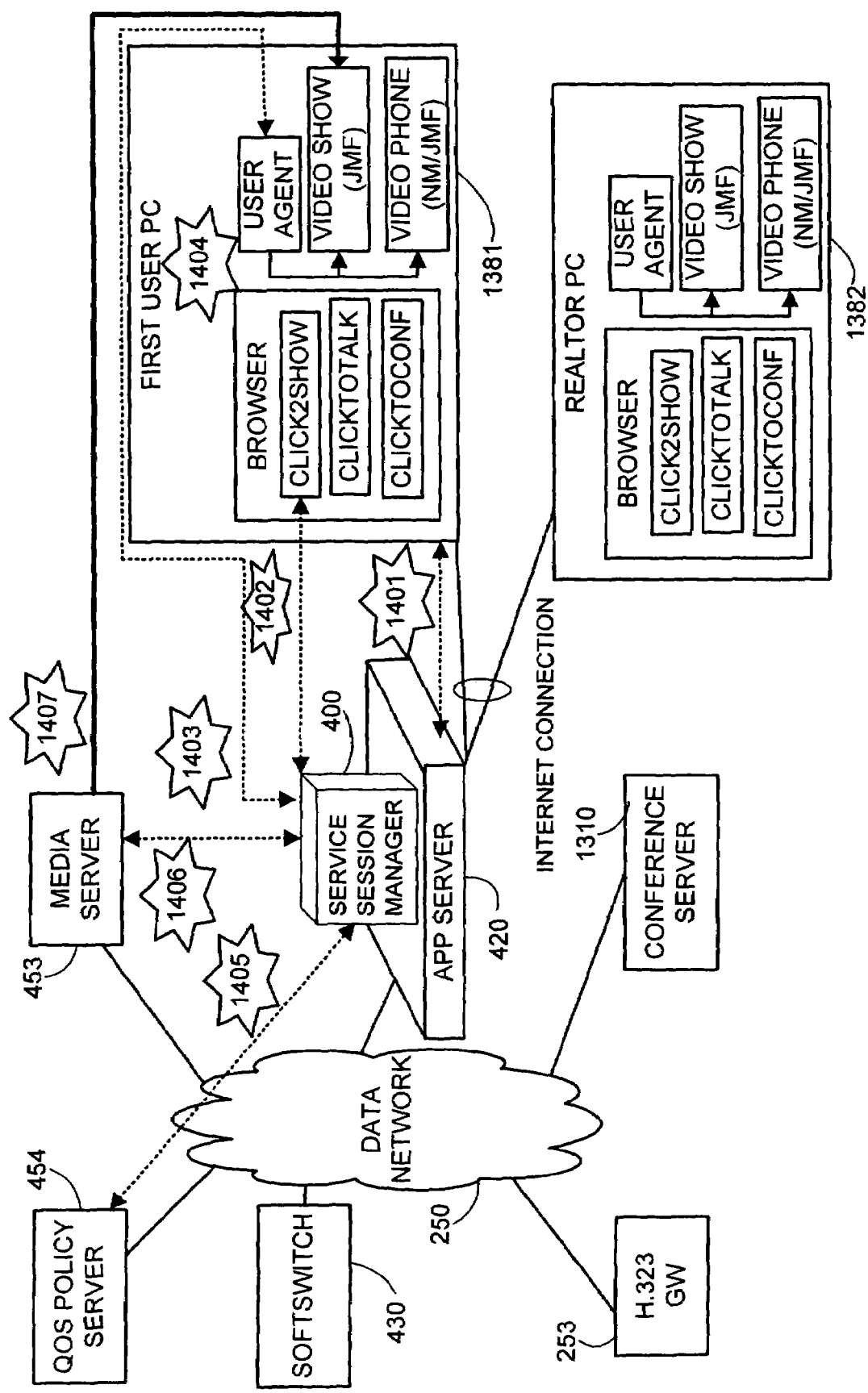
FIG. 14 shows an illustration of a portion of operations in accordance with the embodiment illustrated in FIG. 13.

FIG. 14 shows an illustration of a portion of operations in accordance with the embodiment illustrated in FIG. 13. The first user is searching the web and would like to enter the online real estate agency service web site, for example, via application server 420 (communication 1401). In an embodiment, the first user can be asked to access the service as a customer or as an realtor. When entering as a customer, the first user can be required to provide information such as his name, phone number, and email address. When entering as an realtor, the first user can be required to give his name and password. Information collected from the first user including the IP address of the first user's PC 1381 can be sent to the service session manager 1100 running in the application server 420. Once the first user is registered (e.g., as a customer, as an realtor), a user agent is downloaded into the first user's PC 1381 for handling service requests. Then the first user is then able to browse the real estate listings (e.g., displayed on web pages). The first user finds the house he is interested in and clicks "Click2Show" button displayed under the illustration of the house (e.g., on a web page). A service request is sent to the service session manager 1100 (communication 1402). The service session manager 1100 sends a request message to the user agent running in the first user's PC 1381 (communication 1403) and asks the user agent to start the JMF (Java Media Framework) client for receiving the video. After the request is received, the user agent starts the JMF client (communication 1404) and responds to the service manager for request completion. After the response from the user agent is received, the service session manager sends a request to the QoS server 454 to reserve the bandwidth between two end-points for the video streaming (communication 1405). In an embodiment, QoS on demand is not implemented. In this case, the service session manager 1100 sends the video streaming request to the media server 453 where the video clips are stored (communication 1406). The media server 453 starts to stream video into the first user's PC 1481 based on the IP address and clip ID provided by the service session manager (communication 1407).

Figure 15:
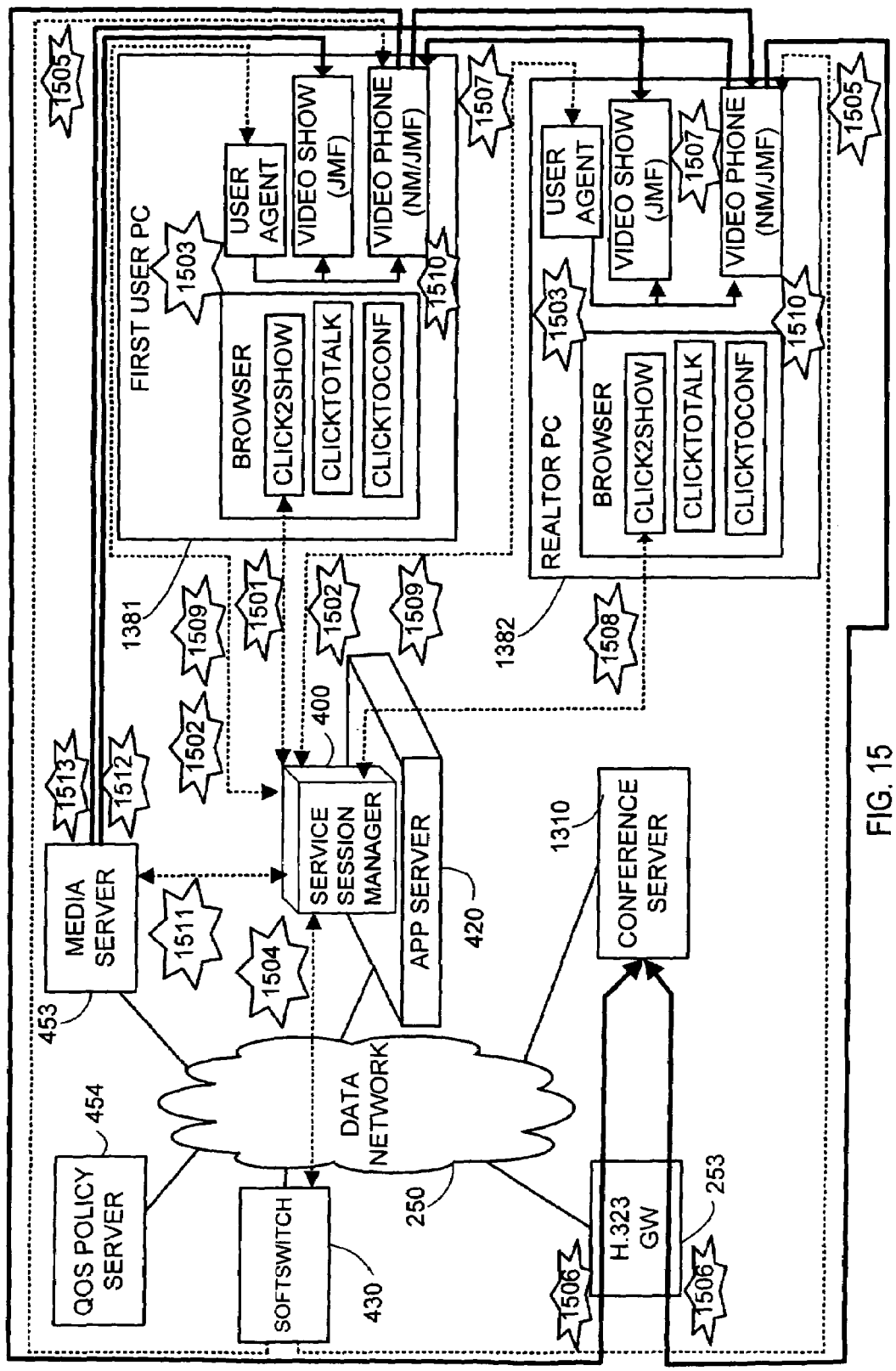
FIG. 15 shows an illustration of an additional portion of operations in accordance with the embodiment illustrated in FIG. 13.

FIG. 15 shows an illustration of an additional portion of operations in accordance with the embodiment illustrated in FIG. 13. After review of one or more video clips, the first user decides to talk to a live realtor and clicks a "Click2Talk" button associated with an illustration of a house on a web page. In an embodiment, the first user can select a realtor he would like to talk to, and a service request is sent to the service session manager 400 (communication 1501). After the service request is received, the service session manager sends a request to the user agents (communications 1502) running in the first user's PC 1381 and the realtor's PC 1382 to ask the respective user agents to start the NetMeeting ("NM") and JMF clients running in the respective PCs 1381 and 1382 (communications 1503).

In an embodiment, the NetMeeing/JMF clients can be started when the realtor decides to "accept" the incoming call. After the request is received, the user agent of the realtor's PC 1382 can pop up a call notification window that can display the caller's number and name. The notification window can include several options (such as Accept, Reject, VoiceMail, and Ignore) that the realtor can select. If the realtor selects the Accept option, the user agent can notify the service session manager 400 to complete the call. In an embodiment including video telephony, the video show/JMF logic sends a local face image and waits to receive the face image of the other party to form a multimedia call. In another embodiment in which a softswitch doesn't support a multi-media call, the video portion of the call can go through a different channel (e.g., a JMF channel). When the softswitch 430 can make the third party call, the Accept message can be sent back to the service session manager 400, which can notify the softswitch 430 to setup the two parties call.

After receiving "accept" confirmation from the user agent (e.g., from the user agent of the realtor's PC 1382), the service manager sends the third party call request to softswitch 430 (communication 1504). In an embodiment, the softswitch 430 makes calls to the two parties (communications 1505) and routes the calls to the conference server 1310 where the two parties are bridged together. In an embodiment, the call can be routed to an IP-based conference server. A bearer channel is established between two NetMeeting end-points (communications 1506). The user agent starts the video streaming (of face images) and send the stream to each other. Both parties receive the face image of the other party of the call. Now a multi-media call session is established between the first user at PC 1381 and the realtor at PC 1382 (communications 1507).

After some discussion, the realtor would like to show some other houses to the first user and clicks a "Click2Show" button. A service request is thereby sent to the service session manager 400 (communication 1508). The service session manager 400 sends another request to the user agent in first user's PC 1381 and the realtor's PC 1382 to start the JMF clients (communications 1509). The respective user agents start the respective JMF clients (communications 1510). The service session manager sends a request to the media server 453 to send video clip streams to the two parties so that the two parties can view the same video clips (communication 1511). The media server 453 sends the video stream to the first user's PC 1381 (communication 1512) and to the realtor's PC 1382 (communication 1513).

Figure 16:
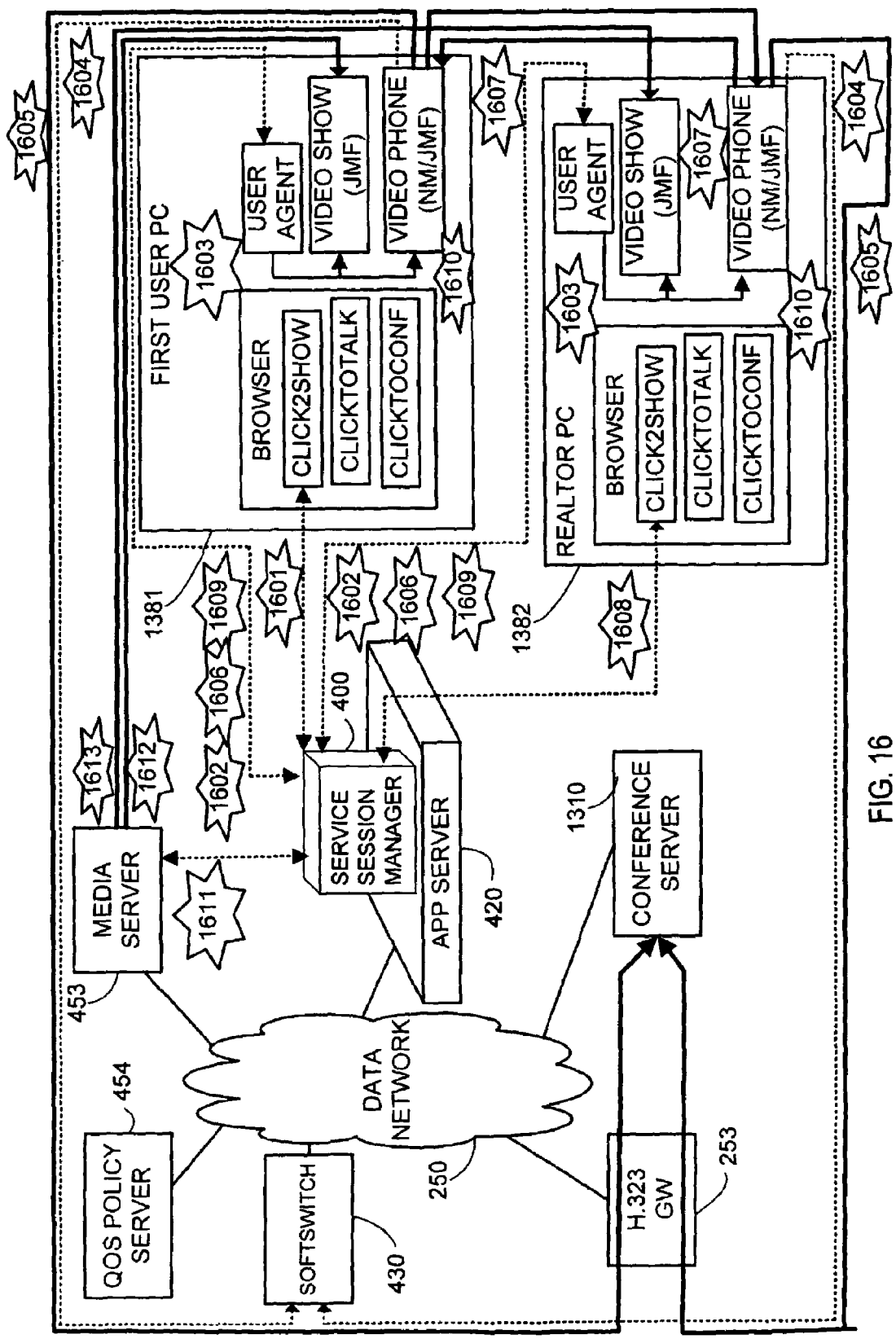
FIG. 16 shows another illustration of the operations illustrated in FIG. 15.

FIG. 16 shows another illustration of the operations illustrated in FIG. 15. After review of one or more video clips, the first user decides to talk to a live realtor and clicks a "Click2Talk" button associated with an illustration of a house on a web page. In an embodiment, the first user can select a realtor he would like to talk to, and a service request is sent to the service session manager 400 (communication 1601). After the service request is received, the service session manager 400 sends a request to the user agent running in the first user's PC 1381 and the realtor's PC 1382 (communications 1602) to ask the respective user agents to start the NetMeeting ("NM") and JMF clients running in the respective PCs 1381 and 1382 (communications 1603). In the embodiment illustrated in FIG. 16, the softswitch 430 does not support a third-party initiated call, and the service session manager asks the NetMeeting clients of the PCs 1381 and 1382 to initiate calls into the softswitch 430

After the request is received, the user agent of the realtor's PC 1382 can pop up a call notification window that can display the caller's number and name. The notification window can include several options (such as Accept, Reject, VoiceMail, and Ignore) that the realtor can select. If the realtor selects the Accept option, the user agent can launch the NetMeeting and JMF clients, and the NetMeeting clients can call the softswitch. In another embodiment in which a softswitch doesn't support a multi-media call, the video portion of the call can go through a different channel (e.g., a JMF channel). When the softswitch 430 can make the third party call, the Accept message can be sent back to the service session manager 400, which can notify the softswitch 430 to setup the two parties call.

In an embodiment, H.323 call signaling is sent to the softswitch 430 (communications 1604), and the softswitch 430 routes the call to conference server 1310, which can be implemented in a service node in an embodiment. In an embodiment, the call can be routed to an IP-based conference server. A bearer channel is established between two NetMeeting end-points (communications 1605). The service session manager 400 can instruct the user agents to start video streaming (of face images) and send the streams to each other (communications 1606). Both parties receive the face image of the other party of the call (communications 1607). Now a multi-media call session is established between the first user at PC 1381 and the realtor at PC 1382.

After some discussion, the realtor would like to show some other houses to the first user and clicks a "Click2Show" button. A service request is thereby sent to the service session manager 400 (communication 1608). The service session manager 400 sends another request to the user agent in first user's PC 1381 and the realtor's PC 1382 to start the JMF clients (communications 1609). The respective user agents start the respective JMF clients (communications 1610). The service session manager 400 sends a request to the media server 453 to send video clip streams to the two parties so that the two parties can view the same video clips (communication 1611). The media server 453 sends the video stream to the first user's PC 1381 (communication 1612) and to the realtor's PC 1382 (communication 1613).

Figure 17:
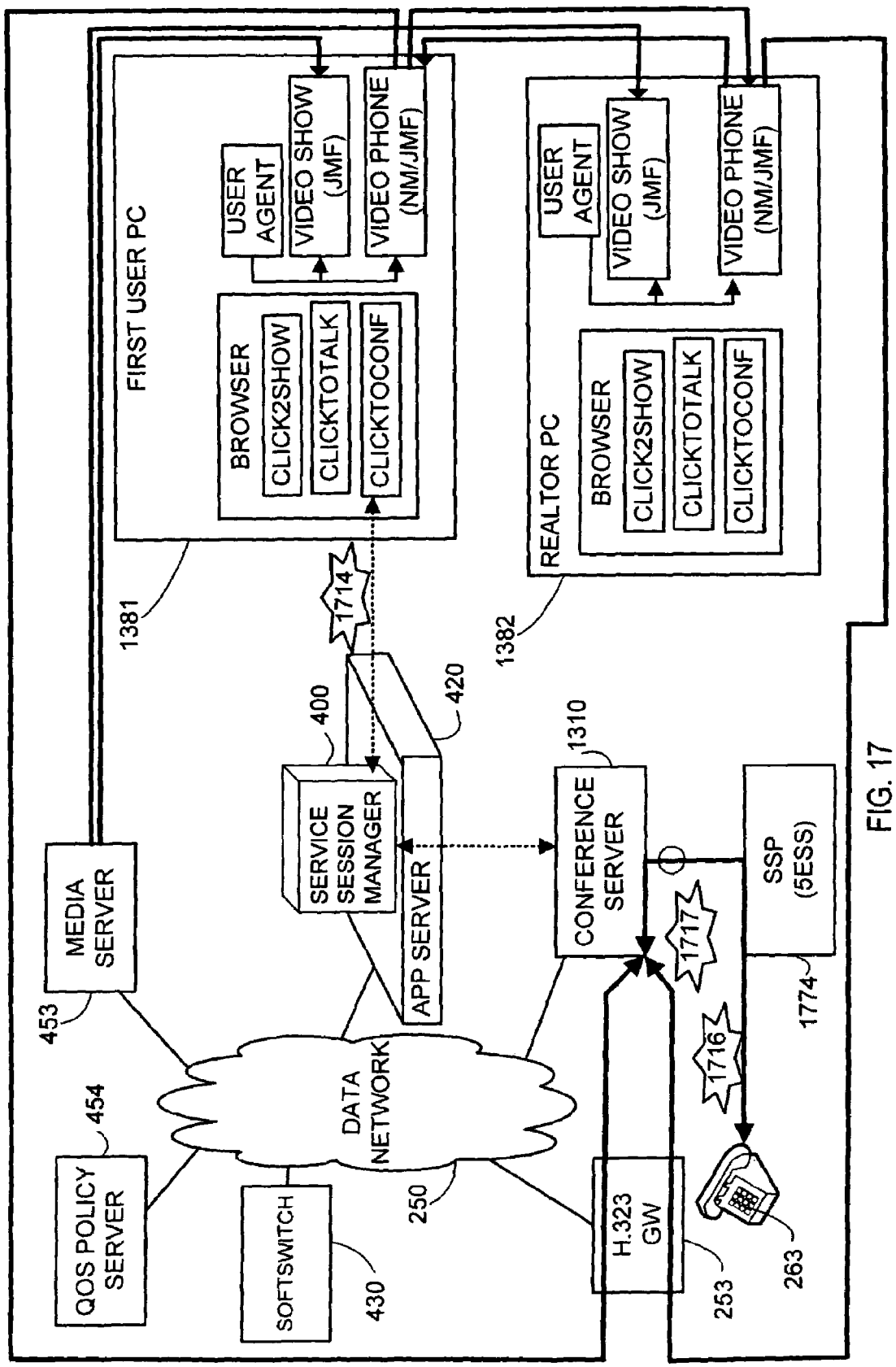
FIG. 17 shows an illustration of an additional portion of operations in accordance with the embodiment illustrated in FIG. 13.

FIG. 17 shows an illustration of an additional portion of operations in accordance with the embodiment illustrated in FIG. 13. After some discussion and video viewing with the realtor, the first user can decide to get a second user (e.g., the first user's spouse) on the phone. The first user can click a displayed "Click2Conference" button and provide the phone number of the second user. A service request is thereby sent to the service session manager 400 (communication 1714). The service session manager 400 can send a request to the conference server 1310 to invite another party to join the conference (communication 1715). In an embodiment, a CSCE can use a service node as its conference server. In another embodiment, the CSCE can use an IP-based conference server. The conference server 1310 can make a call to the second user based on the information provided by the service session manager 400 (communication 1716). After the call is answered by the second user, the second user can be brought into the conference (communication 1717).

Figure 18A:
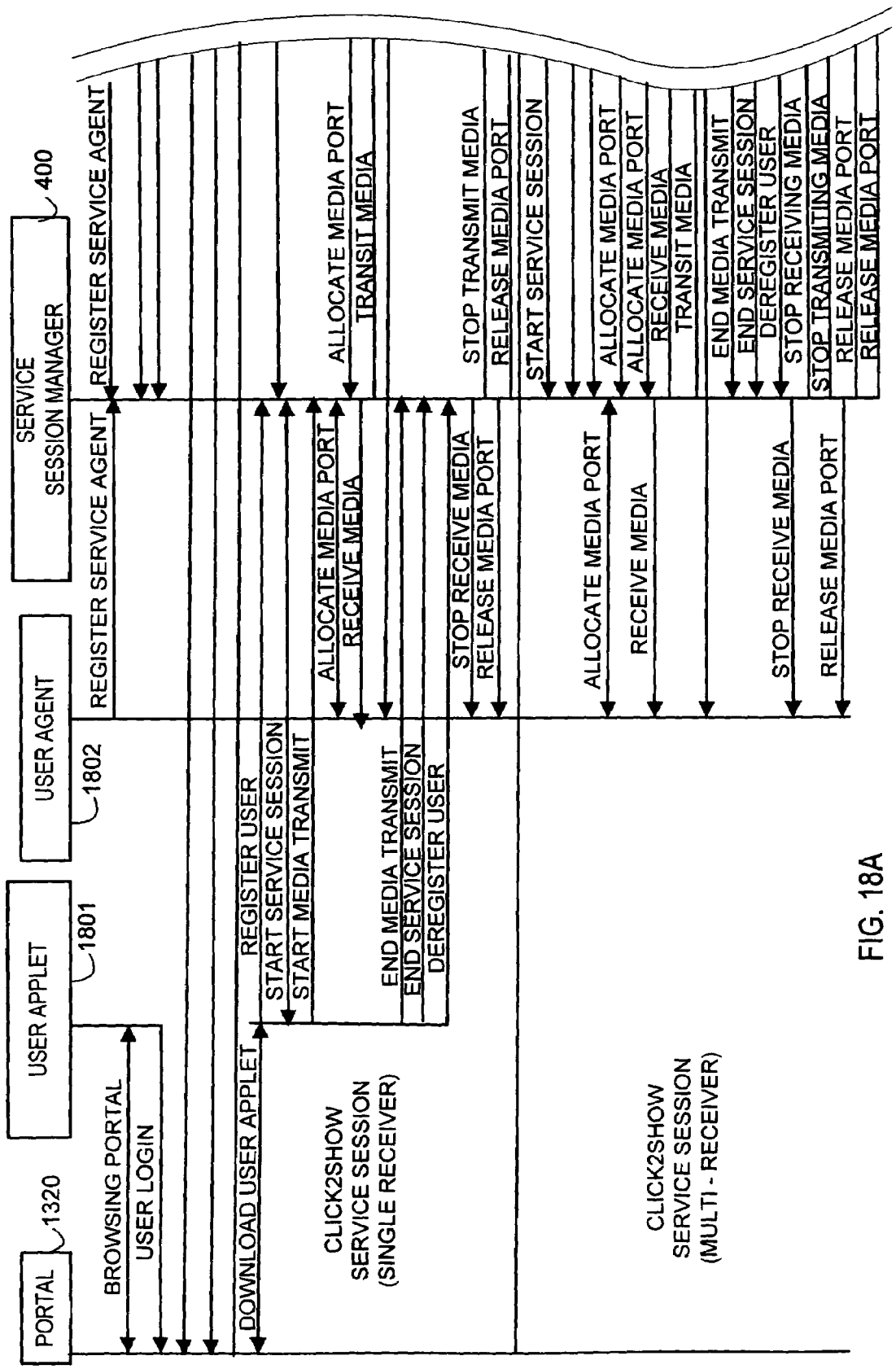
FIG. 18 shows another embodiment of communications operations of a CSCE architecture related to a message sequence for a Click2Show application.
Figure 18B:
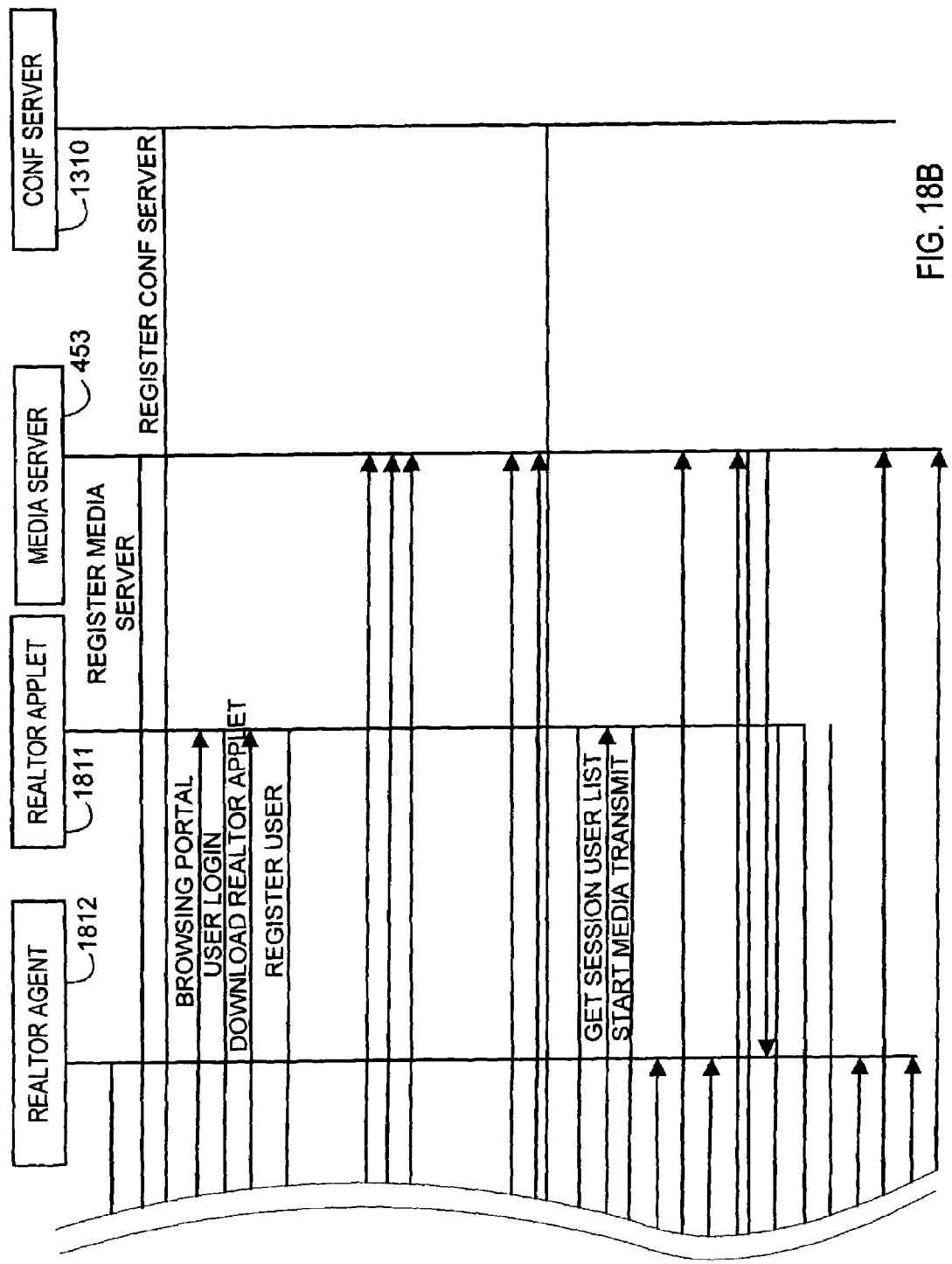
Figure 19A:
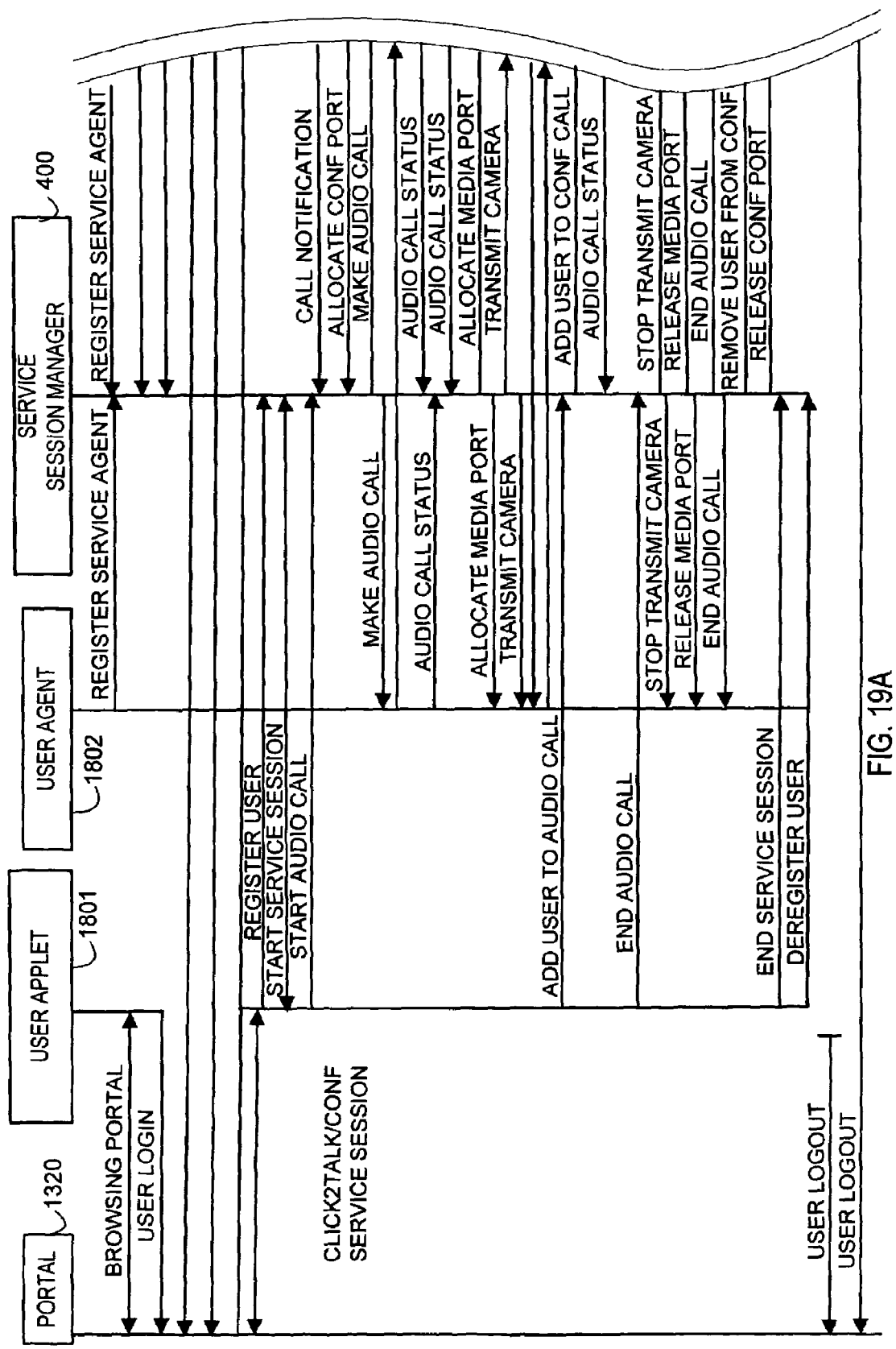
FIG. 19 shows another embodiment of communications operations of a CSCE architecture related to a message sequence for a Click2Conference application.
Figure 19B:
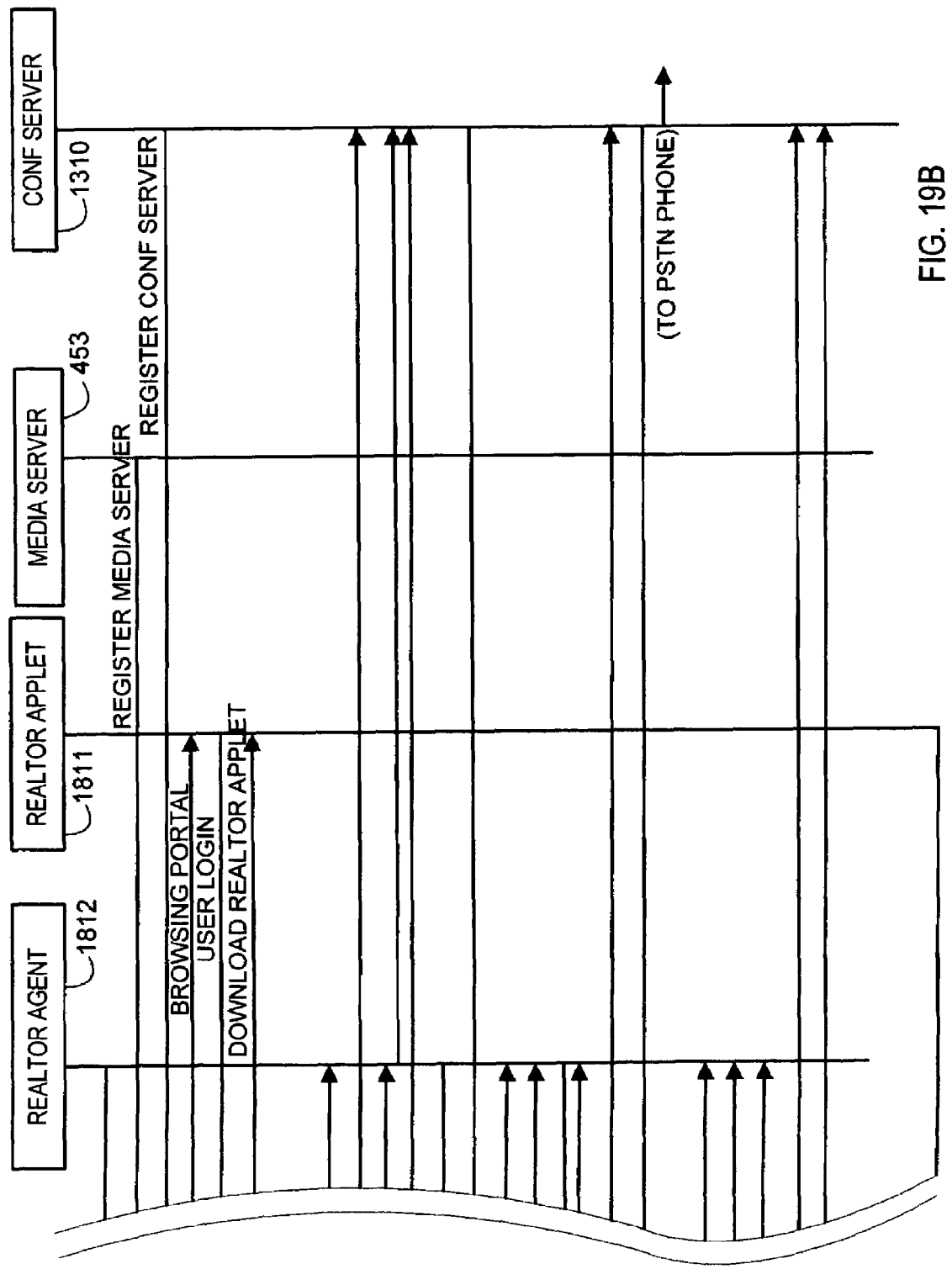

FIG. 18 shows another embodiment of communications operations of a CSCE architecture. In the embodiment illustrated in FIG. 18, communications operations of a Click2Show service session (single receiver) and Click2Show service session (multi-receiver) are shown in a CSCE architecture including portal 1320, user applet 1801, user agent 1802, service session manager 400, realtor agent 1812, realtor applet 1811, media server 453, and conference server 1310. FIG. 19 shows another embodiment of communications operations of a CSCE architecture. In the embodiment illustrated in FIG. 19, communications operations of a Click2Talk/Conf service session are shown in a CSCE architecture including portal 1320, user applet 1801, user agent 1802, service session manager 400, realtor agent 1812, realtor applet 1811, media server 453, and conference server 1310.

In accordance with an embodiment of the present invention, instructions adapted to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions adapted to be executed. The terms "instructions adapted to be executed" and "instructions to be executed" are meant to encompass any instructions that are ready to be executed in their present form (e.g., machine code) by a processor, or require further manipulation (e.g., compilation, decryption, or provided with an access code, etc.) to be ready to be executed by a processor.

Systems and methods in accordance with the embodiments of the present invention disclosed herein can advantageously provide a converged service creation and execution environment ("CSCE") for an integrated data network. The integrated data network can include an ATM network, an IP network, an MPLS network or a combination thereof. The integrated data network can include and/or be coupled to a PSTN network that includes an AIN/SS7 signaling network. A vendor independent service creation and execution framework can be provided by a CSCE architecture. In an embodiment, it can be easy to add new network functional components. A CSCE architecture can provide for upgrading technology without a major impact to service creation and execution. The CSCE infrastructure can be interfaced with an AIN service creation infrastructure, and a service session control mechanism can facilitate converged service creation and execution. The CSCE architecture can be modular, scalable and extensible.

Embodiments of systems for an integrated data network converged service creation and execution environment have been described. In the foregoing description, for purposes of explanation, numerous specific details are set forth to provide a thorough understanding of the present invention. It will be appreciated, however, by one skilled in the art that the present invention may be practiced without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the present invention.

In the foregoing detailed description, systems and methods in accordance with embodiments of the present invention have been described with reference to specific exemplary embodiments. Accordingly, the present specification and figures are to be regarded as illustrative rather than restrictive.

What is claimed is:

1. A method of providing online multimedia support to a sales presentation comprising:
   registering a first user, the registering of the first user including at least the receipt of an IP address of a computing device of the first user;
   downloading a first user agent to the computing device of the first user, wherein the first user agent is a software object executing on the computing device of the first user allowing the first user to browse a website residing on a computing device of a merchant, the computing device of the merchant executing a second user agent;
   receiving a first service request from the website of the merchant, the service request resulting from a prompt from the first user;
   sending a first request message to the first user agent to instantiate a media framework application for receiving a video stream;
   requesting a video stream designated by a clip ID that is transmitted from a media server to the computing device of the first user based at least in art on the IP address and the clip ID;
   sending a second request message to the first user agent and to the second user agent to instantiate a media framework application and an internet meeting application within the first computing device and the merchant computing device, respectively; and
   establishing a communication channel via a conference serve between the first computing device and the merchant computing device where the first user agent and the second user agent each initiates a video stream to each other.

2. A method for creating a quality of Service (QoS) channel for audio/visual streaming from a media server to a customer IP device executing a user agent comprising:
   receiving a service request from a user of the customer IP device via an internet for an application service from the media server;
   downloading a user applet for a web based application to the customer IP device via the internet, the user applet thereafter communicating with the user agent regarding the service request, the user agent being a software object executing on the customer IP device operable to manage delivery of the application service wherein the user applet interacts with the user of the customer IP device to collect the user's service request, transmitting the user's service request and display the result of the user's service request to the user;

transmitting a first service instruction to the audio/visual user agent via the internet and a second service instruction to both a media server and a QoS server via a messaging bus, the QoS server managing the quality of the application service provided from the media server; and establishing the QoS channel for audio/visual streaming between the media server and the customer IP device via a data network based at least in part on the first service instruction, the user agent managing receipt of audio/visual data and instructions for the customer IP device.

3. The method of claim 2, further comprising receiving one or more service acknowledgements from each of the media server, the QoS server and the audio/visual user agent.

4. A method for creating a narrowband service between a pubic switched telephone network (PSTN) and a customer IP device comprising:

receiving a service request from a user of the customer IP device via an internet for a narrow band application service from an media server, the customer IP device which is executing a user agent, the user agent being a software object executing on the customer IP device operable to manage delivery of the narrow band application service;

downloading a user applet for a web based application to the user IP device via the internet, the user applet thereafter communicating with the user agent regarding the service request;

transmitting a first service instruction to the user agent via the internet and a second service instruction to a softswitch via a messaging bus, the softswitch managing narrowband application service provided from the PSTN, wherein the softswitch includes an SS7 protocol stack, a media control gateway protocol (MCGP) stack, an H.323 protocol stack and a session initiation protocol (SIP) stack for generalized call processing with the PSTN;

establishing the narrowband service between the PSTN and the customer IP device via a data network based at least in part on the first service instruction, the user agent managing receipt of narrow band data and instructions for the customer IP device.

\* \* \* \* \*